US008204186B2

(12) United States Patent
Kovales et al.

(10) Patent No.: US 8,204,186 B2
(45) Date of Patent: *Jun. 19, 2012

(54) SELECTABLE AUDIO AND MIXED BACKGROUND SOUND FOR VOICE MESSAGING SYSTEM

(75) Inventors: Renee M. Kovales, Cary, NC (US); Edith H. Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 55 days.

This patent is subject to a terminal disclaimer.

(21) Appl. No.: 12/896,888

(22) Filed: Oct. 3, 2010

(65) Prior Publication Data

US 2011/0019804 A1 Jan. 27, 2011

Related U.S. Application Data

(63) Continuation of application No. 12/053,554, filed on Mar. 22, 2008, now Pat. No. 7,965,824, which is a continuation of application No. 10/632,177, filed on Jul. 31, 2003, now Pat. No. 7,424,098, which is a continuation of application No. 09/782,773, filed on Feb. 13, 2001, now Pat. No. 7,003,083.

(51) Int. Cl.
*H04M 1/64* (2006.01)
(52) U.S. Cl. .................. 379/88.23; 379/207.01
(58) Field of Classification Search ............. 379/67.1, 379/68, 88.13, 88.16, 88.19, 88.2, 88.21, 379/88.22, 88.23, 201.01
See application file for complete search history.

(56) References Cited

U.S. PATENT DOCUMENTS

| | | | |
|---|---|---|---|
| 4,104,821 A | 8/1978 | Nakajima | |
| 5,189,692 A | 2/1993 | Ferrara | |
| 5,243,643 A | 9/1993 | Sattar et al. | |
| 5,384,701 A | 1/1995 | Stentiford et al. | |
| 5,434,910 A | 7/1995 | Johnson et al. | |
| 5,481,597 A | 1/1996 | Given | |
| 5,530,950 A | 6/1996 | Medan et al. | |
| 5,655,006 A | 8/1997 | Cox et al. | |
| 5,661,783 A | 8/1997 | Assis | |
| 5,692,038 A | 11/1997 | Kraus et al. | |
| 5,708,698 A | 1/1998 | Akahane | |
| 5,717,741 A | 2/1998 | Yue et al. | |
| 5,721,827 A | 2/1998 | Logan et al. | |
| 5,742,736 A | 4/1998 | Haddock | |
| 5,797,124 A | 8/1998 | Walsh et al. | |

(Continued)

OTHER PUBLICATIONS

Renee Kovales et al., U.S. Appl. No. 12/053,554, filed Mar. 22, 2008, Office Action, Sep. 15, 2010, 5 pages.

(Continued)

*Primary Examiner* — Olisa Anwah
(74) *Attorney, Agent, or Firm* — Marcia L. Doubet

(57) ABSTRACT

Methods, systems, computer program products, and methods of doing business by selectably mixing one or more sound files with a telephone caller's voice message, either as background for that message or embedded within the message. Or, the mixing may occur within a telephone conversation between parties. The disclosed techniques enable alleviating some of the problems that result from distance communication (as contrasted to face-to-face communication). In particular, context information (such as emotional context) can be provided through appropriate use of background sound and/or embedded audio files. The disclosed techniques may also make communication through voice mail exchange more enjoyable and/or increase its productivity.

12 Claims, 20 Drawing Sheets

U.S. PATENT DOCUMENTS

| | | | |
|---|---|---|---|
| 5,844,158 A | 12/1998 | Butler et al. | |
| 5,850,431 A | 12/1998 | Satou | |
| 5,860,065 A | 1/1999 | Hsu | |
| 5,862,209 A | 1/1999 | Kapsales | |
| 5,915,001 A | 6/1999 | Uppaluru | |
| 5,943,402 A | 8/1999 | Hamel et al. | |
| 6,055,495 A | 4/2000 | Tucker et al. | |
| 6,108,629 A | 8/2000 | Kasday | |
| 6,112,177 A | 8/2000 | Cosatto et al. | |
| 6,125,175 A * | 9/2000 | Goldberg et al. | 379/201.01 |
| 6,199,076 B1 | 3/2001 | Logan et al. | |
| 6,240,391 B1 | 5/2001 | Ball | |
| 6,330,436 B1 | 12/2001 | Zidel | |
| 6,393,107 B1 | 5/2002 | Ball et al. | |
| 6,407,325 B2 | 6/2002 | Yi et al. | |
| 6,442,243 B1 | 8/2002 | Valco et al. | |
| 6,442,523 B1 | 8/2002 | Siegel | |
| 6,449,345 B1 | 9/2002 | Grimes | |
| 6,453,294 B1 | 9/2002 | Dutta et al. | |
| 6,459,774 B1 | 10/2002 | Ball et al. | |
| 6,487,533 B2 | 11/2002 | Hyde-Thomson et al. | |
| 6,501,739 B1 | 12/2002 | Cohen | |
| 6,529,602 B1 | 3/2003 | Walker et al. | |
| 6,532,477 B1 | 3/2003 | Tang et al. | |
| 6,549,767 B1 | 4/2003 | Kawashima | |
| 6,567,506 B1 | 5/2003 | Kermani | |
| 6,587,033 B1 | 7/2003 | Morishima | |
| 6,625,261 B2 | 9/2003 | Holtzberg | |
| 6,634,992 B1 | 10/2003 | Ogawa | |
| 6,650,737 B2 | 11/2003 | Finnigan | |
| 6,683,938 B1 | 1/2004 | Hendersen | |
| 6,757,365 B1 | 6/2004 | Bogard | |
| 6,760,704 B1 | 7/2004 | Bennett | |
| 6,775,557 B2 | 8/2004 | Tsai | |
| 6,789,107 B1 | 9/2004 | Bates et al. | |
| 6,804,806 B1 | 10/2004 | Bansal et al. | |
| 6,807,574 B1 | 10/2004 | Partovi et al. | |
| 6,832,350 B1 | 12/2004 | Bates et al. | |
| 6,842,767 B1 | 1/2005 | Partovi et al. | |
| 6,870,807 B1 | 3/2005 | Chan et al. | |
| 6,876,729 B1 | 4/2005 | Kuter et al. | |
| 6,970,906 B1 | 11/2005 | Parsons et al. | |
| 6,975,988 B1 | 12/2005 | Roth et al. | |
| 7,003,083 B2 | 2/2006 | Kovales et al. | |
| 7,062,437 B2 | 6/2006 | Kovales et al. | |
| 7,065,342 B1 | 6/2006 | Rolf | |
| 7,203,286 B1 | 4/2007 | Brockenbrough et al. | |
| 7,424,098 B2 | 9/2008 | Kovales et al. | |
| 7,457,397 B1 | 11/2008 | Saylor et al. | |
| 7,512,219 B2 | 3/2009 | Kovales et al. | |
| 7,965,824 B2 | 6/2011 | Kovales et al. | |
| 2002/0032752 A1 | 3/2002 | Gold et al. | |
| 2002/0055844 A1 | 5/2002 | L'Esperance et al. | |
| 2002/0082007 A1 | 6/2002 | Hoisko et al. | |
| 2002/0082838 A1 | 6/2002 | Hinde et al. | |
| 2002/0110224 A1 | 8/2002 | Kovales et al. | |
| 2002/0110226 A1 | 8/2002 | Kovales et al. | |
| 2002/0110248 A1 | 8/2002 | Kovales et al. | |
| 2002/0114431 A1 | 8/2002 | McBride et al. | |
| 2002/0178137 A1 | 11/2002 | Hasegawa | |
| 2002/0191757 A1 | 12/2002 | Belrose | |
| 2003/0013432 A1 | 1/2003 | Fukaya | |
| 2003/0028380 A1 | 2/2003 | Freeland et al. | |
| 2003/0115059 A1 | 6/2003 | Jayaratne | |
| 2003/0191682 A1 | 10/2003 | Shepard et al. | |
| 2004/0008827 A1 | 1/2004 | Martin et al. | |
| 2004/0022371 A1 | 2/2004 | Kovales et al. | |
| 2004/0247098 A1 | 12/2004 | Valco et al. | |
| 2008/0025480 A1 | 1/2008 | Kovales et al. | |
| 2008/0031427 A1 | 2/2008 | Kovales et al. | |
| 2008/0165939 A1 | 7/2008 | Kovales et al. | |

OTHER PUBLICATIONS

Renee Kovales et al., U.S. Appl. No. 12/053,554, filed Mar. 22, 2008, Examiner's Interview Summary, Feb. 10, 2011, 3 pages.
Renee Kovales et al., U.S. Appl. No. 12/053,554, filed Mar. 22, 2008, Notice of Allowance, Feb. 14, 2011, 4 pages.
Renee Kovales et al., U.S. Appl. No. 12/053,554, filed Mar. 22, 2008, Office Action, Oct. 12, 2010, 4 pages.
Renee Kovales et al., U.S. Appl. No. 12/053,554, filed Mar. 22, 2008, Examiner Interview Summary, Nov. 12, 2010, 3 pages.
Renee Kovales et al., U.S. Appl. No. 12/053,554, filed Mar. 22, 2008, Office Action, Nov. 17, 2010, 10 pages.
Renee Kovales et al., U.S. Appl. No. 09/782,773, filed Feb. 13, 2001, Office Action, Mar. 31, 2003, 5 pages.
Renee Kovales et al., U.S. Appl. No. 09/782,773, filed Feb. 13, 2001, Petition Decision, Jul. 21, 2004, 2 pages.
Renee Kovales et al., U.S. Appl. No. 09/782,773, filed Feb. 13, 2001, Office Action, Oct. 25, 2004, 5 pages.
Renee Kovales et al., U.S. Appl. No. 09/782,773, filed Feb. 13, 2001, Office Action, May 3, 2005, 4 pages.
Renee Kovales et al., U.S. Appl. No. 09/782,773, filed Feb. 13, 2001, Notice of Allowance, Nov. 4, 2005, 9 pages.
Renee Kovales et al., U.S. Appl. No. 10/632,177, filed Jul. 31, 2003, Office Action, Mar. 29, 2006, 16 pages.
Renee Kovales et al., U.S. Appl. No. 10/632,177, filed Jul. 31, 2003, Office Action, Sep. 1, 2006, 9 pages.
Renee Kovales et al., U.S. Appl. No. 10/632,177, filed Jul. 31, 2003, Examiner's Interview Summary, Oct. 31, 2006, 2 pages.
Renee Kovales et al., U.S. Appl. No. 10/632,177, filed Jul. 31, 2003, Advisory Action, Nov. 14, 2006, 3 pages.
Renee Kovales et al., U.S. Appl. No. 10/632,177, filed Jul. 31, 2003, Office Action, Feb. 8, 2007, 12 pages.
Renee Kovales et al., U.S. Appl. No. 10/632,177, filed Jul. 31, 2003, Office Action, Jul. 17, 2007, 13 pages.
Renee Kovales et al., U.S. Appl. No. 10/632,177, filed Jul. 31, 2003, Office Action, Jan. 15, 2008, 9 pages.
Renee Kovales et al., U.S. Appl. No. 10/632,177, filed Jul. 31, 2003, Notice of Allowance, Feb. 8, 2008, 6 pages.
Renee Kovales et al., U.S. Appl. No. 11/868,485, filed Oct. 6, 2007, Office Action, Oct. 15, 2008, 6 pages.
Renee Kovales et al., U.S. Appl. No. 11/868,485, filed Oct. 6, 2007, Office Action, Dec. 8, 2008, 9 pages.
Renee Kovales et al., U.S. Appl. No. 11/868,485, filed Oct. 6, 2007, Office Action, Dec. 22, 2008, 11 pages.
Renee Kovales et al., U.S. Appl. No. 11/868,485, filed Oct. 6, 2007, Notice of Abandonment Jul. 7, 2009, 2 pages.
Renee Kovales et al., U.S. Appl. No. 11/868,487, filed Oct. 6, 2007, Notice of Allowance, Oct. 21, 2008, 6 pages.
Renee Kovales et al., U.S. Appl. No. 11/868,487, filed Oct. 6, 2007, Supplemental Notice of Allowance, Mar. 6, 2009, 3 pages.
"WAP & SMS Services. We bring the Internet to your mobile!", www.iobox.com/iobox, printed Jan. 27, 2001, 1 page.
"Sonera", www.sonera.fi/english, printed Jan. 27, 2001, 1 page.
"Powertel", www.ptel.zed.com/html/login/login.html, printed Jan. 9, 2001, 1 page.
"MP3 Downloads: Will they "Cell"?", http://www.wirenews.com/news/print/0,1294,39271,00.html, printed Jan. 9, 2001, 2 pages.
Renee Kovales et al., U.S. Appl. No. 09/782,564, filed Feb. 13, 2001, Restriction Requirement, Mar. 21, 2005, 7 pages.
Renee Kovales et al., U.S. Appl. No. 09/782,564, filed Feb. 13, 2001, Office Action, Sep. 22, 2005, 12 pages.
Renee Kovales et al., U.S. Appl. No. 09/782,564, filed Feb. 13, 2001, Notice of Allowance, Feb. 7, 2006, 4 pages.
Renee Kovales et al., U.S. Appl. No. 09/782,772, filed Feb. 13, 2001, Office Action, Mar. 18, 2004, 11 pages.
Renee Kovales et al., U.S. Appl. No. 09/782,772, filed Feb. 13, 2001, Office Action, Aug. 26, 2004, 11 pages.
Renee Kovales et al., U.S. Appl. No. 09/782,772, filed Feb. 13, 2001, Advisory Action, Jan. 28, 2005, 3 pages.
Renee Kovales et al., U.S. Appl. No. 09/782,772, filed Feb. 13, 2001, Office Action, Jun. 29, 2005, 11 pages.
Renee Kovales et al., U.S. Appl. No. 09/782,772, filed Feb. 13, 2001, Office Action, Jan. 4, 2006, 12 pages.
Renee Kovales et al., U.S. Appl. No. 09/782,772, filed Feb. 13, 2001, Pre-Appeal Brief Conference Decision, May 25, 2006, 2 pages.
Renee Kovales et al., U.S. Appl. No. 09/782,772, filed Feb. 13, 2001, Office Action, Aug. 8, 2006, 20 pages.
Renee Kovales et al., U.S. Appl. No. 09/782,772, filed Feb. 13, 2001, Office Action, Jan. 26, 2007, 21 pages.

Renee Kovales et al., U.S. Appl. No. 09/782,772, filed Feb. 13, 2001, Pre-Appeal Brief Conference Decision, Jul. 17, 2007, 2 pages.
Renee Kovales et al., U.S. Appl. No. 09/782,772, filed Feb. 13, 2001, Office Action, Oct. 17, 2007, 13 pages.
Renee Kovales et al., U.S. Appl. No. 09/782,772, filed Feb. 13, 2001, Office Action, May 1, 2008, 13 pages.
Renee Kovales et al., U.S. Appl. No. 09/782,772, filed Feb. 13, 2001, Advisory Action, Jul. 14, 2008, 3 pages.
Renee Kovales et al., U.S. Appl. No. 09/782,772, filed Feb. 13, 2001, Office Action, Oct. 16, 2008, 12 pages.
Renee Kovales et al., U.S. Appl. No. 09/782,772, filed Feb. 13, 2001, Office Action, Apr. 15, 2009, 12 pages.
Renee Kovales et al., U.S. Appl. No. 09/782,772, filed Feb. 13, 2001, Notice of Defective Appeal Brief, Jan. 11, 2010, 2 pages.
Renee Kovales et al., U.S. Appl. No. 09/782,772, filed Feb. 13, 2001, Examiner's Answer, May 11, 2010, 15 pages.
Renee Kovales et al., U.S. Appl. No. 09/782,772, filed Feb. 13, 2001, Appeal Docketing Notice, Aug. 31, 2010, 2 pages.

* cited by examiner

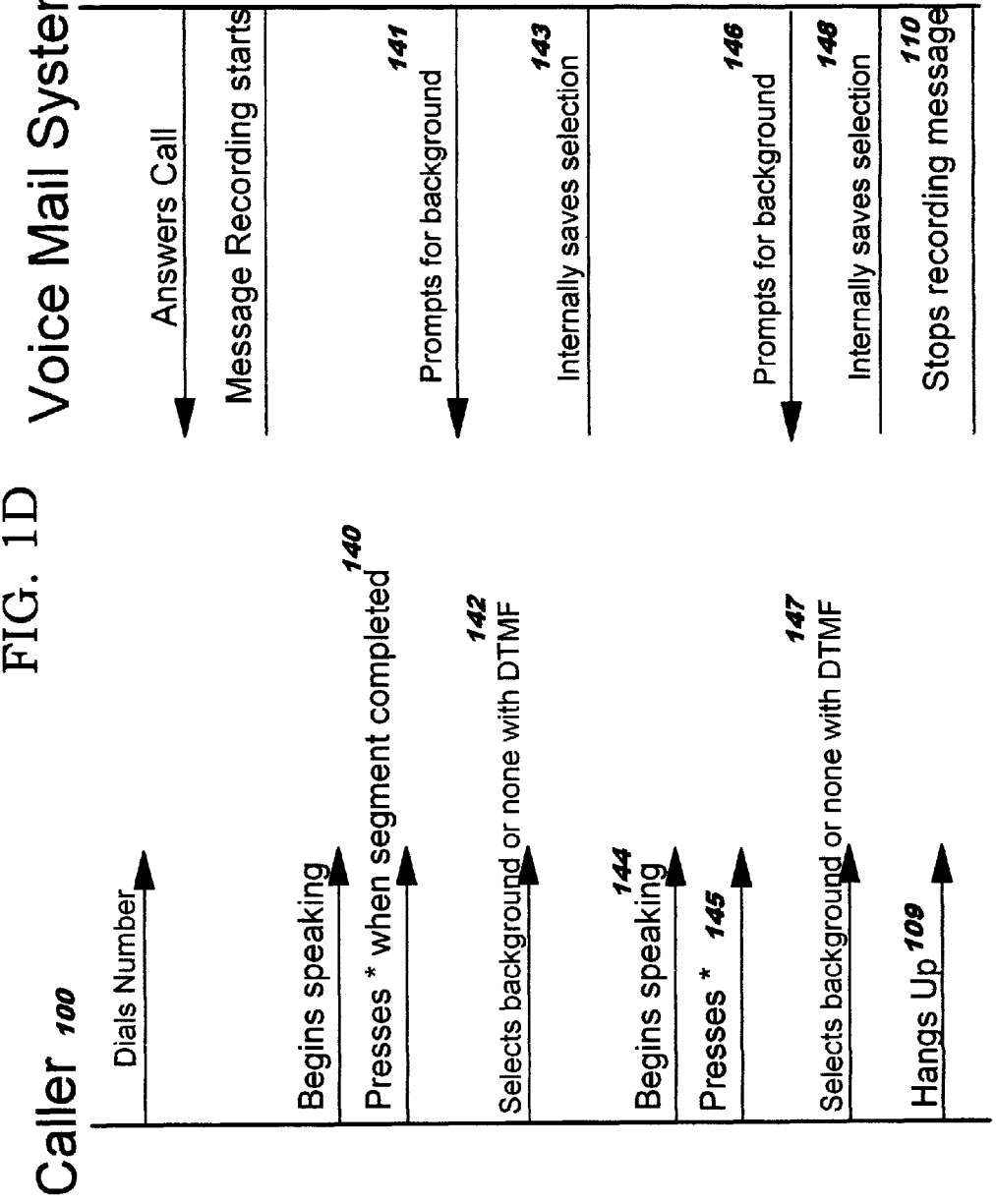

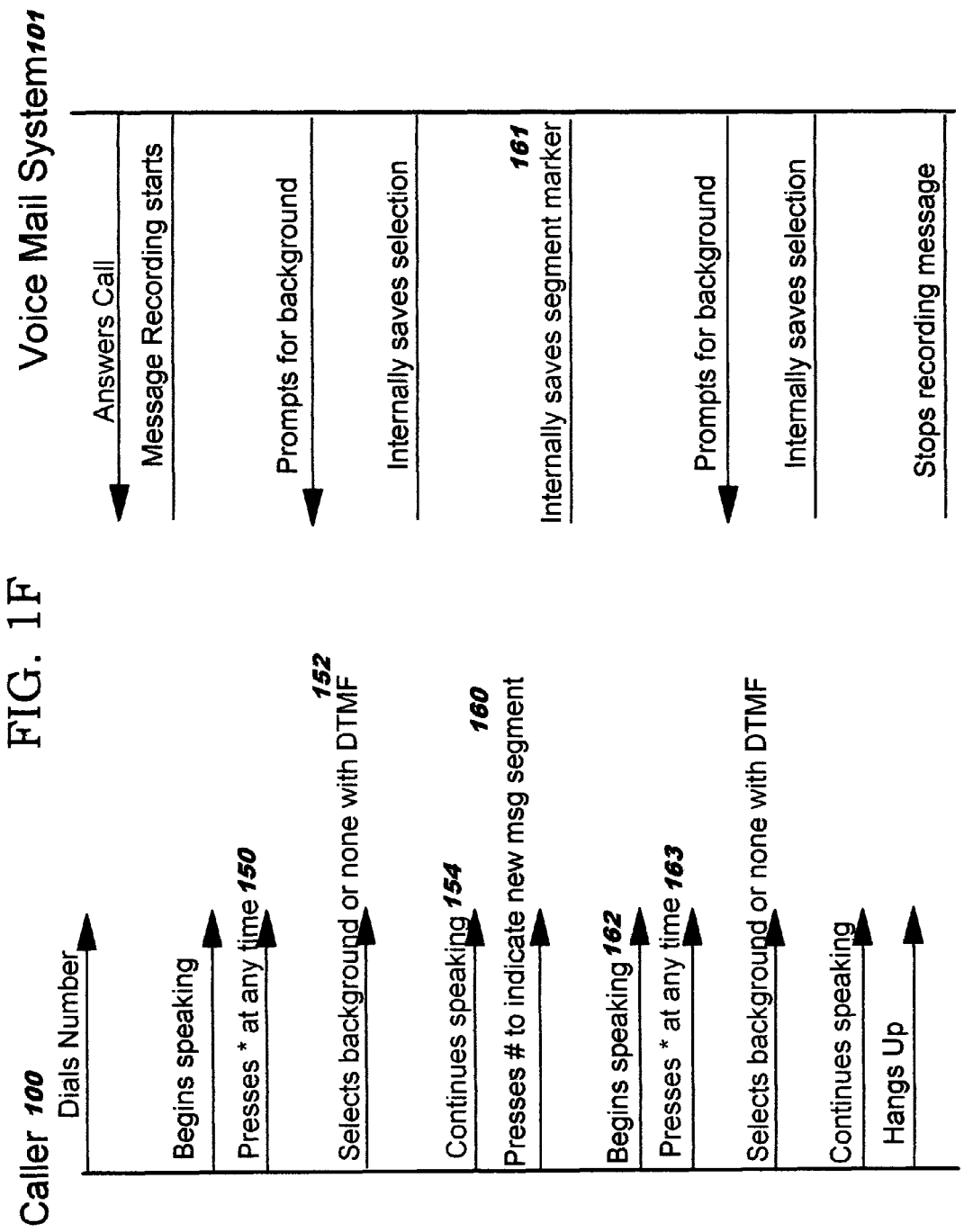

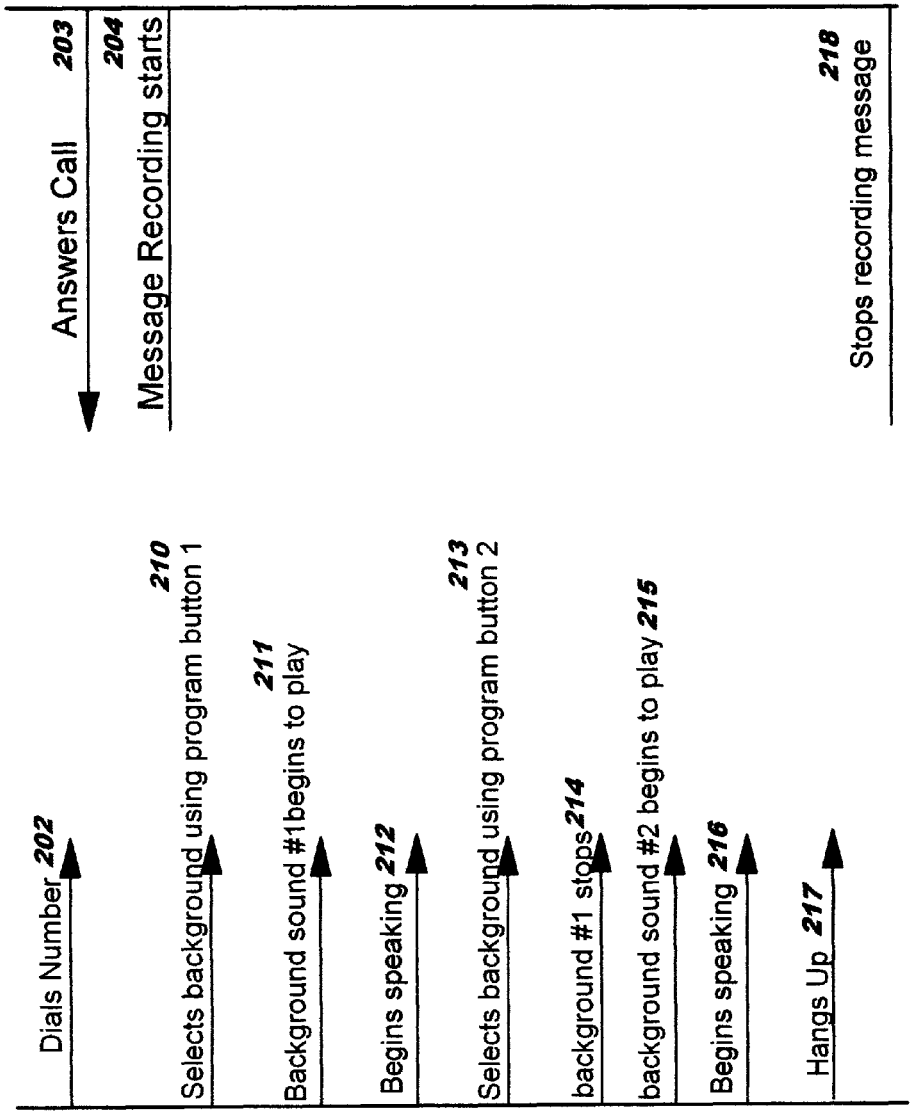

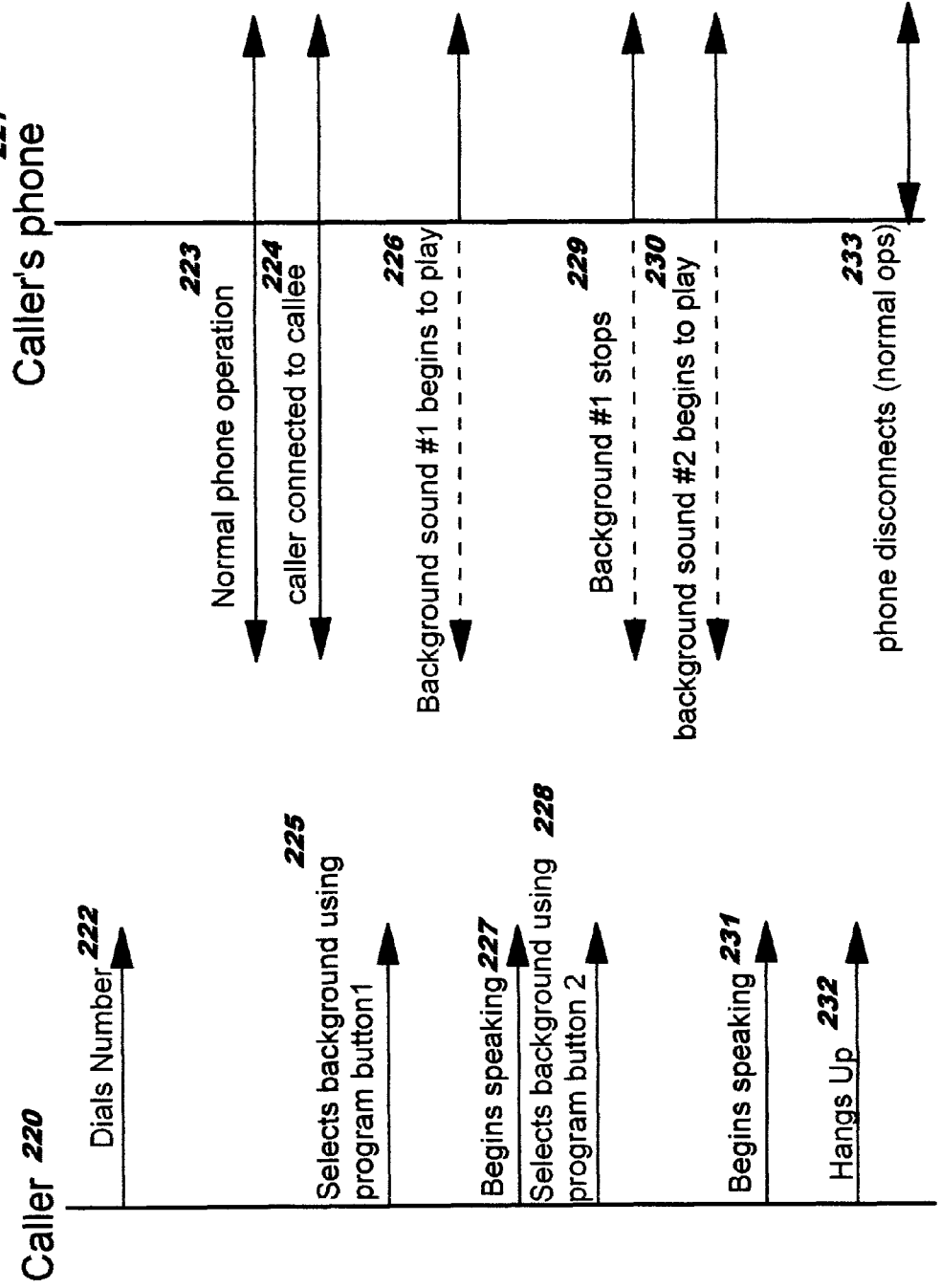

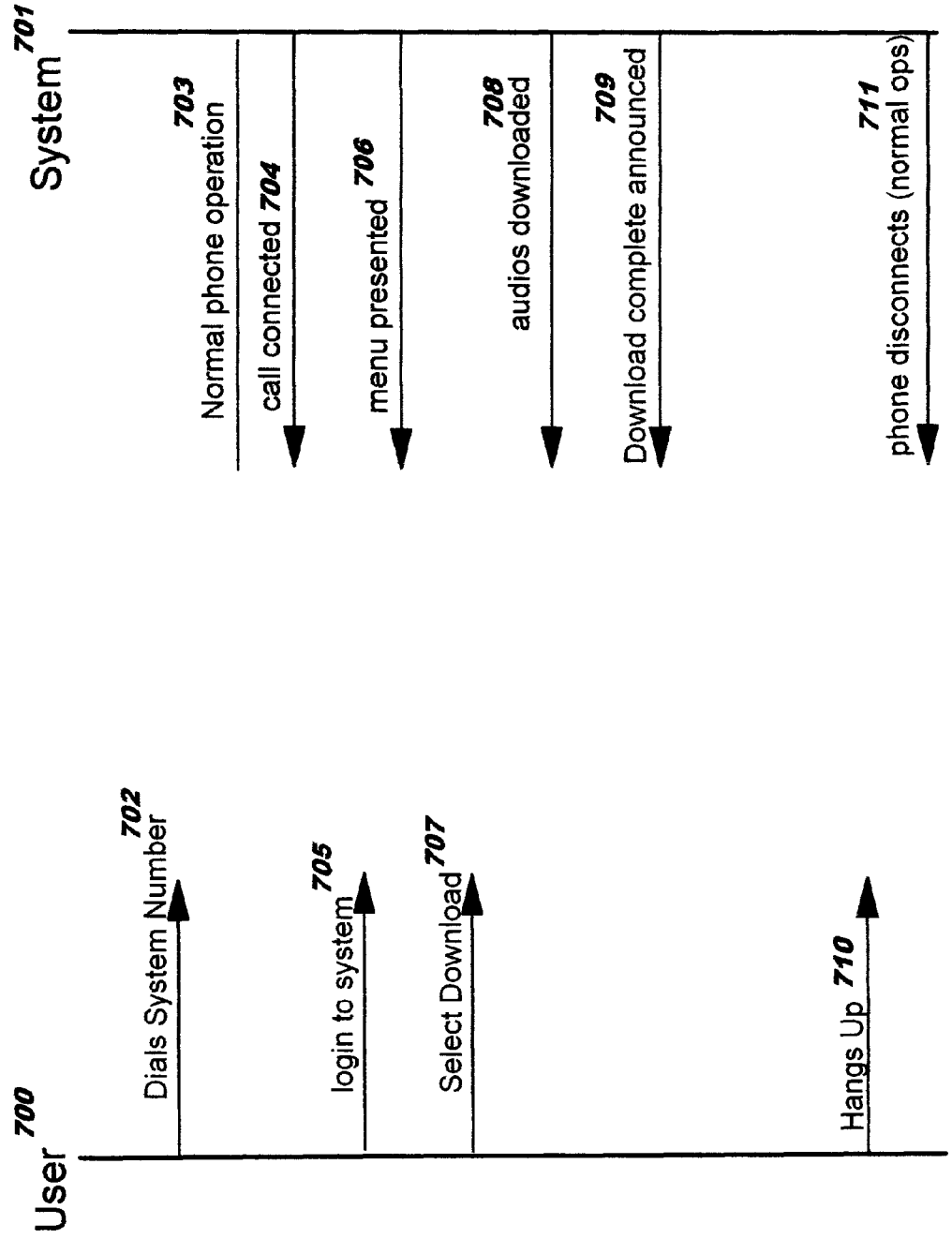

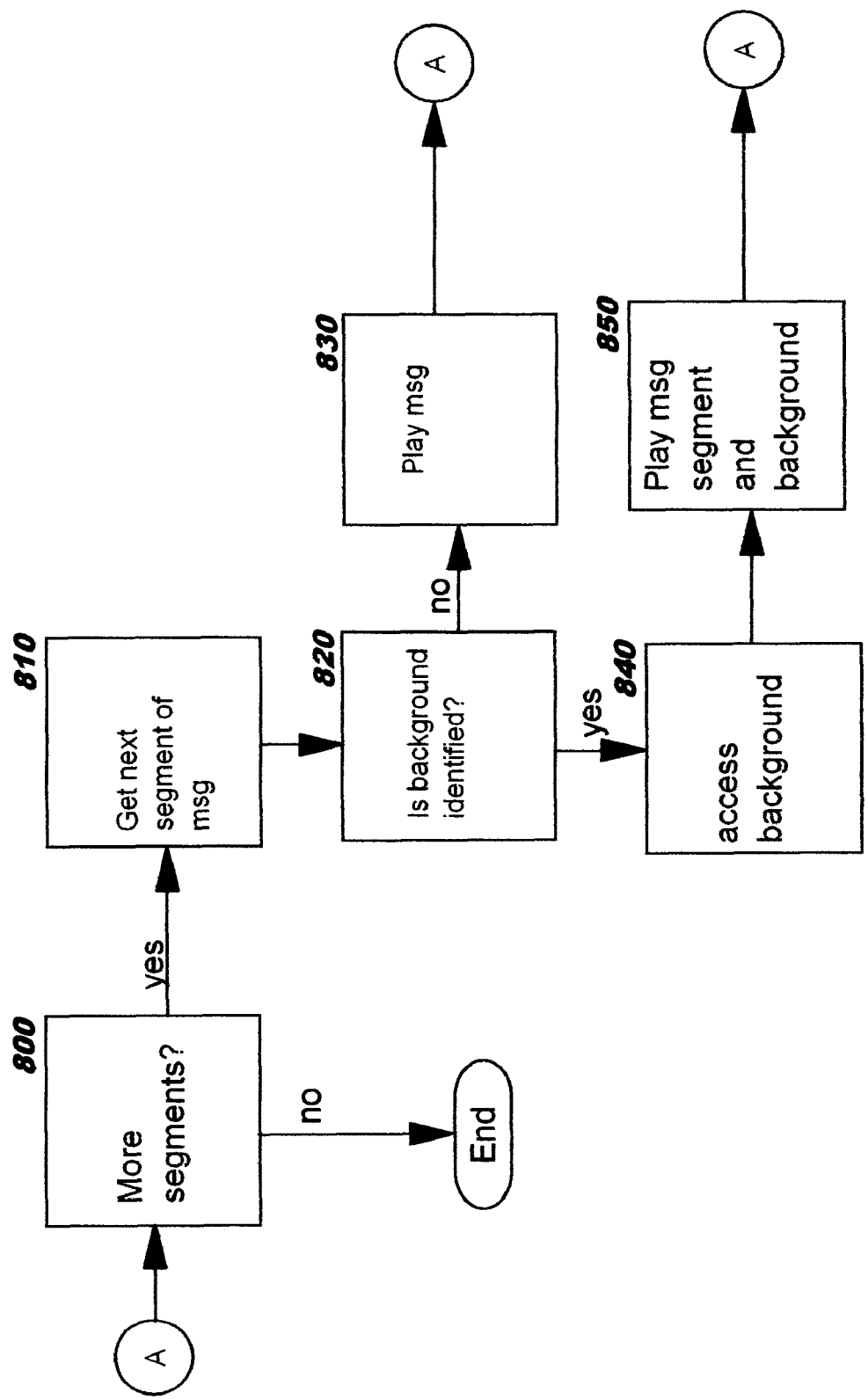

FIG. 9A

Message Segment Data Structure *900*
Message segment number
Background selection number
User message

Example code:
define MAX_NUM_VOICE_SEGMENTS 500      *910*

Struct msg_struct   *920*
{
    Int segment_number;   /* this field is not necessarily required */
    Int background_selection_number;
    FILE *msg;   /* could be a .wav file */
}
Struct msg_struct voice_msg[MAX_NUM_VOICE_SEGMENTS]   *930*

FIG. 9B

Message Segment Data Structure *940*
    Message segment number
    Selection type
    Selection number
    User message (only valid if selection type is not an audio file)

Example code: *950*
define MAX_NUM_VOICE_SEGMENTS 500

Struct msg_struct *960*
{
    Int segment_number;  /* this field is not necessarily required */
    int selection_type;  /* this is 1 = background, 2 = audio file */
    Int selection_number;
    FILE *msg;  /* could be a .wav file - will be null for audio file */
}
Struct msg_struct voice_msg[MAX_NUM_VOICE_SEGMENTS] *970*

SELECTABLE AUDIO AND MIXED BACKGROUND SOUND FOR VOICE MESSAGING SYSTEM

CROSS-REFERENCE TO RELATED APPLICATIONS

The present invention is a Continuation of U.S. patent application Ser. No. 12/053,554 now U.S. Pat. No. 7,965,824 B2), filed Mar. 22, 2008, which is a Continuation of U.S. patent application Ser. No. 10/632,177 (now U.S. Pat. No. 7,424,098), filed Jul. 31, 2003, which is a Continuation of U.S. patent application Ser. No. 09/782,773, (now U.S. Pat. No. 7,003,083 B2), filed Feb. 13, 2001, which are hereby incorporated herein by reference. The present invention is related to the following commonly-assigned U.S. patent applications, which are hereby incorporated herein by reference: U.S. patent application Ser. No. 09/782,564 (now U.S. Pat. No. 7,062,437 B2), entitled "Audio Renderings for Expressing Non-Audio Nuances"; U.S. patent application Ser. No. 09/782,772, entitled "Recording and Receiving Voice Mail with Freeform Bookmarks"; U.S. patent application Ser. No. 11/868,485 (now abandoned), entitled "Selectable Audio and Mixed Background Sound for Voice Messaging System"; and U.S. patent application Ser. No. 11/868,487 (now U.S. Pat. No. 7,512,219 B2), entitled "Selectable Audio and Mixed Background Sound for Voice Messaging System".

BACKGROUND OF THE INVENTION

1. Field of the Invention

The present invention relates to a computer system, and deals more particularly with methods, systems, computer program products, and methods of doing business by selectably mixing one or more sound files with a telephone caller's voice message (or within the caller's person-to-person conversation), either as background for that message or embedded within the message.

2. Description of the Related Art

Face-to-face communication between people involves many parallel communication paths. We derive information from body language, from words, from intonation, from facial expressions, from the distance between our bodies, and so forth. Distance communication, such as phone calls, e-mail exchange, and voice mail, on the other hand, involves only a few of these communication paths. Users may therefore have to take extra actions (which may or may not be successful) if they wish to try to overcome the limitations so imposed.

Emotions may be particularly difficult to convey when using distance communication. For example, if a person is angry, it can be quite difficult to communicate that emotion in the words of an e-mail message. While a voice mail message has the advantage of conveying the speaker's tone of voice, it still may not adequately represent the speaker's emotion. As another example of the difficulties of distance communication, suppose a speaker has many different topics to cover. When communicating in person, the speaker can use changes in body language to indicate a change in subject. In a voice mail message, however, it may be difficult for the listener to appreciate when one topic has ended and another has begun.

Distance communicating is becoming more prevalent in our society. Many people use mobile phones, answering machines, and/or sophisticated voice mail systems extensively today, and thus we have become accustomed to being able to reach someone (or at least their telephone recording system) by phone at all times of the day or night. (Hereinafter, the phrase "voice mail system" will be used to refer to telephone recording systems which include computerized voice mail systems as well as simple answering machines, unless otherwise noted.) A caller might place a call at a time that is convenient for her, even though she knows that the called party is unable to receive the message in person at that time: she simply leaves a message, and the called party is then free to receive the message some time later, at his own convenience. A "telephone tag" scenario may result, where a sequence of messages is exchanged by way of voice mail systems, without the people actually speaking directly to one another.

For people whose jobs involve a great deal of telephone contact, such as executives, salespeople, customer service people, and so forth, the number (and length) of messages that accumulate in their voice mail system over the course of a day may be quite large. Similarly, people who are unable to answer their telephone for extended periods (for example, someone who is on vacation, traveling on business, interacting by phone with people in distant time zones, or simply too busy with other commitments) may build up a large backlog of unanswered messages. The process of listening to all of the accumulated messages can therefore be quite tedious, as well as time-consuming. If the listener's concentration is interrupted during the playback process, it may be necessary to start the playback of a particular message again, requiring even more of the listener's time and further testing his patience.

In addition, people who must make a large number of telephone calls often find the calling process tedious, especially if they are unsuccessful in reaching the called party in person and must instead leave a message. It would be preferable to provide a way of improving the distance communication process for callers and called parties.

Accordingly, what is needed is a technique that alleviates disadvantages in distance communications, providing a more enjoyable and more productive way for people to communicate by telephone and to exchange voice mail messages.

SUMMARY OF THE INVENTION

An object of the present invention is to provide a technique that alleviates disadvantages in distance communications.

Another object of the present invention is to provide this technique by enabling a more enjoyable and more productive way for people to communicate by telephone.

Yet another object of the present invention is to provide this technique by enabling a more enjoyable and more productive way to exchange voice mail messages.

A further object of the present invention is to provide this technique by adding contextual information to audio messages.

Still another object of the present invention is to provide these advantages by adding background sound to a voice mail message (or, alternatively, to a telephone conversation).

Another object of the present invention is to provide these advantages by using embedded audio files as voice mail messages or within voice mail messages (or, alternatively, within a telephone conversation).

Yet another object of the present invention is to provide new methods of doing business, whereby the sound files to be used during (or instead of) a voice mail message or telephone conversation can be merchandised to consumers.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, in a first aspect the present invention provides methods, systems, computer program products, and methods of doing business by enhancing voice mail messages. This technique comprises incorporating one or more selected background sounds with a voice mail message for playback to a listener. In selected embodiments, at least one of the background sounds may provide emotional cues for the voice mail message, or may be a theme song associated with a speaker who leaves the voice mail message. The background sounds may be selected in a number of ways, including: by a speaker of the voice mail message; programmatically; by using a default background sound for the speaker; making a dynamic selection from among a plurality of background sounds (including random selection); using a profile associated with the speaker; or based upon an identification of an intended recipient of the voice mail message. Incorporating the background sound(s) may further comprise conferencing the selected background sounds into a 3-way call between a speaker of the voice mail message and a receiver thereof. Telephone conversations may be enhanced in a similar manner.

In another aspect, the present invention provides methods, systems, computer program products, and methods of doing business by providing audio input for voice mail messages and telephone conversations. This technique comprises inserting one or more selected audio files into a voice mail message for playback to a listener. In selected embodiments, a single audio file may be inserted in the voice mail message more than once, and at least one of the audio files may be an audio signature or a theme song associated with a speaker who records the voice mail message. The audio file(s) may even comprise the entire voice mail message.

An apparatus is also disclosed for improving voice mail messaging, comprising: means for transmitting a voice message from a user of the apparatus to a separately-located recording means; means for storing one or more pre-recorded sound files on the apparatus; selection means for selecting, from the pre-recorded sound files, one or more of: (1) a background sound and (2) an audio file to be transmitted; and transmission means for transmitting the selection to the recording means for use with the transmitted voice message.

A method of merchandising pre-recorded sound files is defined, comprising steps of receiving requests for selected ones of the pre-recorded sound files for use as background files to be incorporated with voice mail messages and/or for use as audio files to be inserted into voice mail messages, and providing the selected ones, in response to receiving the requests. In selected embodiments, this method may be implemented by a for-fee service provider, or by marketing a telephone for use in improving distance communications.

The present invention will now be described with reference to the following drawings, in which like reference numbers denote the same element throughout.

BRIEF DESCRIPTION OF THE DRAWINGS

FIGS. 1A through 1F are flow diagrams illustrating how a caller may enhance a voice mail message by selecting one or more background sounds that are offered by a receiving system (such as a voice mail system), according to preferred embodiments of the present invention;

FIGS. 2A through 2C are flow diagrams illustrating how a caller may enhance a voice mail message by selecting one or more background sounds that are provided from the caller's telephone, according to preferred embodiments of the present invention;

FIGS. 7A and 7B are flow diagrams illustrating how a background sound or audio file may be obtained for use in a voice mail message or telephone conversation, where a fee may optionally be imposed by the provider of that background sound or audio file, according to preferred embodiments of the present invention;

FIG. 8 provides a flowchart depicting logic with which preferred embodiments may implement playback of a voice mail message; and FIGS. 9A and 9B depict examples of data structures that may be used to facilitate implementation of preferred embodiments of the present invention.

DESCRIPTION OF THE PREFERRED EMBODIMENTS

Figure 1A:
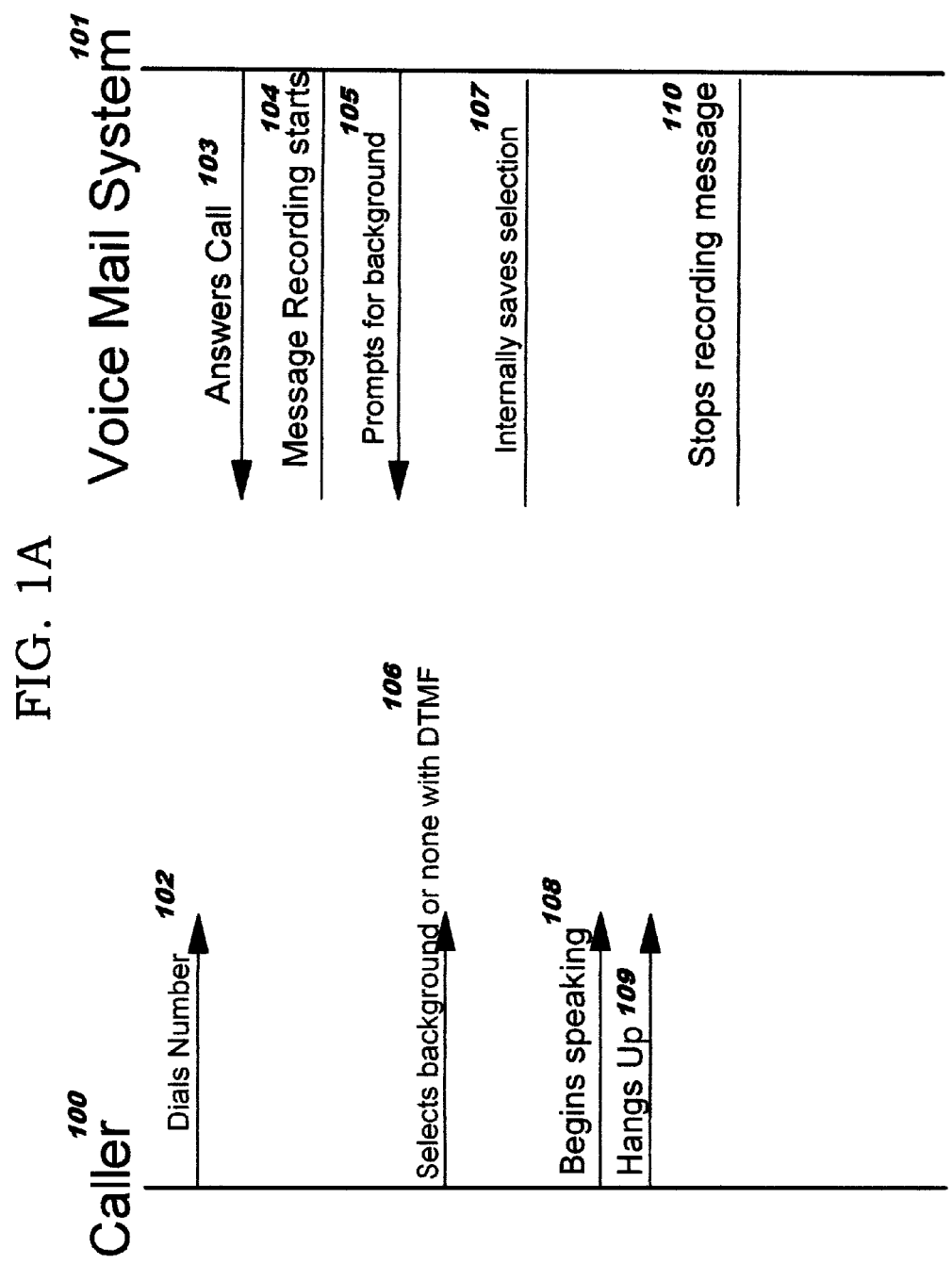

The present invention improves distance communications which use telephones. A number of advantages of the present invention are realized when communicating by exchanging voice mail messages, and other advantages are realized during person-to-person telephone conversations. The disclosed techniques enable associating additional information, beyond a person's voice and words, or alternatively instead of a person's voice and words, with a telephone message or conversation. These techniques may be used to provide emotional cues for messages or conversations, thereby supplementing the contextual information thereof—or perhaps simply improving the listener's perception of the message or her reaction to the message (or conversation). (Hereinafter, the term "message" or "voice mail message" will be used to refer equivalently to telephone conversations, unless otherwise indicated.)

As an example of how this contextual information supplements a voice mail message, the previously-discussed caller who is angry may wish to leave his message with a background of rolling thunder, or perhaps punctuate his message with the sound of inserted lightning strikes. Or, a caller may choose to have a personal "theme song" or "audible signature" (where this audible signature, also referred to herein as an audio signature, may be, for example, a few selected bars of her favorite song). In this example, the caller may select her personal theme song as the background for her voice mail messages, and/or she may wish to precede (or perhaps end) her messages with her audible signature. Once the teachings of the present invention are known, individual callers may use them in a myriad of ways to enhance their distance communications through added background and audio files.

For purposes of the discussion herein, the terms "background sound" and "background file" are used to refer to a sound that is preferably mixed or blended with a concurrently-spoken message to the listener. The term "audio file", on the other hand, is used herein to refer to a sound that is used alone, without concurrent mixing of a caller's voice. (However, an audio sound may be preceded and/or followed by a caller's voice message, where that voice message may or may not be blended with a background sound, according to the teachings disclosed herein.) The term "file" is used hereinafter to refer to sound files (including, but not limited to, music files) that may serve as either background sounds or audio files.

A number of different embodiments of the present invention may be implemented using the teachings disclosed herein. Preferred ones of these embodiments will now be described.

In some preferred embodiments, a telephone caller will be offered a selection of sounds or music files that are available from a receiving voice mail system (VMS). In this case, the VMS preferably prompts the caller to select the desired file. The VMS may present a list from which the caller makes a selection (for example, with a recorded voice that states "press 1 to select Vivaldi's 'Four Seasons', press 2 to select the crashing of the surf at Half Moon Bay", and so forth). Or, the list may be already known to callers of a particular VMS, for example by instructions on a printed reference card. Or, if the caller's phone has a display available (such as that provided with a screen phone or Web-enabled cellular phone), then the VMS may perhaps transmit a list of selections to the display (for example, using data over voice transmission; using shared voice and data transmission; using Short Message Service, or "SMS", techniques; and so forth). Other techniques for presenting a selection list may be used alternatively. The caller may indicate her selection in a number of ways. As one example, her response to the prompting of the VMS may comprise a numeric identifier that she transmits using the dual-tone multi-frequency (DTMF) capability of a touch-tone-enabled phone or equivalent thereto. Or, her phone may have a touch-sensitive display screen, which she presses at an appropriate location to indicate her selection. As still another alternative, she may have a phone with programmable keys or buttons, where a particular key is operably associated with a corresponding selection. As yet another alternative, a particular caller may have a phone in which a default selection has been pre-stored, or which is adapted to dynamically choosing a selection in an automated manner (including random selection). Other selection techniques which are described herein, as well as selection techniques that will be obvious to one of skill in the art (such as voice activation using a spoken response), may be used as well.

In other embodiments, the caller may explicitly select—for example, at the time she is leaving a message—a desired file (or an identification thereof) that will be sent to the VMS, along with her message, without the VMS offering selections. In this case, the caller's selection of the desired file may be made in similar ways to those described for responding to the VMS' prompt (such as pressing keys to transmit a DTMF tone, pressing one or more programmed keys or buttons or a touch-sensitive screen, etc.), where these actions may be interpreted by the caller's phone, causing the phone to transmit a file identifier or a recorded file corresponding to the caller's selection. The transmitted file may be locally stored in the caller's phone, or in local storage that is available to the phone (such as a removable diskette or other media which may be locally attached, or perhaps connected via a wireless communication network such as a Bluetooth piconet). Or, with an appropriately adapted VMS, the caller may send an address such as a Uniform Resource Locator (URL) that identifies the storage location of the file she wishes to use with her message. (URLs may also be used for offering selections to the caller from the VMS, with reference to the above-described embodiments.) This URL may refer to a file stored at the receiving VMS, or perhaps a file that the VMS must download from a remote location such as an intranet or the Internet. As yet another alternative, a telephone company ("telco") system may be adapted to detecting the presence of a URL to be used as a background or audio file, and the telco may retrieve the corresponding file from its local storage or from a remote location such as the Internet. When URLs are supported, the capability exists to select and download background and audio files from a music or sound provider service. (This download capability will be discussed in more detail below, with reference to FIGS. 7A and 7B.) As an alternative to downloading background and audio files, these files may be played directly from their remote location.

Furthermore, instead of allowing the caller to explicitly select a file while making a call, the caller's phone may be adapted for sending a default file (or an identification thereof) to be used as the background or audio associated with this caller's messages. This may be useful, for example, for callers who wish to use theme songs and audible signatures. The choice of default file may be fixed in some cases, either by a phone that provides only one choice or by the caller's previous configuration of her phone to use a single default file. Or, a phone may be programmed with multiple files that may be transmitted for use with the caller's message, where a selection from among these multiple files is made dynamically—perhaps in a random fashion, or in a predetermined ordered fashion. A default may be specific, or it may be more general. For example, the caller's default may be a specific song such as Beethoven's "Eroica", or a more general category such as "anything by Beethoven". Providing selectable files and/or default files enables new methods of doing business whereby phone manufacturers, service providers, or after-market services provide phones that are adapted to appeal to particular listeners. For example, a phone may be marketed with a selection of nature sounds, or a selection of country music songs, or a mix of different types of songs for use as background or audio insertions, or perhaps a collection of "one-liners" by famous comedians (preferably for use as audio insertions, rather than as background sounds). Use of general categories as defaults may be a preferable approach when the caller's phone is sending an identification of a background or audio file that is to be obtained by the VMS (or by the telco), rather than sending the file itself, as this approach makes it more likely that the VMS or telco will be able to satisfy the caller's request and thus provide the desired contextual information for her message.

As yet another alternative, callers may have an identifier (such as a short personal identification number, or "PIN") which is used to identify particular callers to a phone or phone system. Using this technique, a caller may provide his identifier from his own phone or from any phone of his choosing, and the identifier may be used to locate his stored preferences. For example, this technique enables each member of a household to have their own default background sounds even when they call from a single phone or phone number.

The downloading of audio clips to cellular phones, where the audio file is used for the ringing tone to notify the phone's owner of an incoming call, is known in the art. Companies such as "iobox" and Sonera (which markets a service known as "Zed") provide this type of service on a pay-per-use basis, where consumers can select to download one or more clips to their cell phone for a fee. (See http://www.iobox.com/iobox and http://www.sonera.fi/english/ or http://www.ptel.zed.com/html/login/login.html for more information on these services.) However (to the best of the inventors' knowledge and belief), these services are limited to provision of ringing tones, and do not contemplate providing files for use as background or audio for use with a voice mail message.

In yet other embodiments, a profile or subscription service may be used for selecting a file for a particular caller's messages. For example, a caller may configure her phone to use a profile such that it selects from among selections that are accessible thereto according to a set of rules or conditions; or, this type of profile service may alternatively be provided by another entity, such as by the VMS or telco. As an example of using a profile, a particular caller's messages may be augmented with jazz on Fridays, or beach music on Saturdays. Furthermore, embodiments may provide for selecting a file based upon the called number, such as providing a selection from The Three Tenors when the caller calls her mother, love songs when she calls her husband, and so forth. Or, the caller may subscribe to a service which dynamically selects files—e.g. based on preferences that the caller has stored with this service—or which provides a file (or files) already selected by this caller. This type of subscription service may be offered by the receiving VMS or telco, or may be accessed from the VMS or telco in response to receiving a message from a particular caller. A profile service may also be implemented by the receiving VMS or telco. In this case, the caller (or her phone) may transmit a caller identifier which is used to locate a previously-stored profile or preferences file in order to retrieve the background or audio file for this caller's messages. Phones may be marketed which are preconfigured (or configurable) with a phone identifier as well, such that the phone identifier is used when retrieving the background or audio file.

These embodiments may be used for leaving a message with one or more background sounds over a spoken message, for enabling the caller to leave an audio-only message (which may comprise more than one different audio file) or to insert one or more audio files into a voice mail message, and/or for leaving voice messages that combine background sounds and inserted audio files. (In the latter case, the background sound is preferably suppressed or interrupted while the inserted audio file plays to the listener.) Furthermore, these embodiments may also be used during a person-to-person conversation, if desired. For example, a therapist may choose a soothing background sound for phone conversations with his patients (perhaps as a substitute for his soothing in-person persona), or a stockbroker may choose to insert the sound of a cash register into his conversations with clients (e.g. to convey the context of successful business dealings). Leaving an audio-only message may allow the VMS to obtain calling party information in conjunction with the message. Audio-only messages may be useful in situations where, for example, the caller gets switched to a person's voice mail system and then decides to leave an audio message (such as his theme song or audible signature) since he is unable to complete his person-to-person voice message. (While prior art systems provide a type of "audio-only" message whereby computerized calling services play a pre-recorded audio file to a listener or the called party's voice mail, this is a different capability than provided by the present invention. This type of prior art system is typically only available to businesses or organizations, rather than to consumers. The present invention, on the other hand, makes audio-only capabilities easily accessible to the consumer, and does not require the caller to pre-record anything; rather, the caller may simply make a selection from available choices when using the present invention, as will be described in more detail below. Furthermore, the prior art does not teach use of audio-only files as audio signatures, as is described herein.)

In embodiments where the caller's phone transmits a file to a receiving VMS, telco, or to the called party, the phone preferably comprises media to store the source file or files (such as memory, flash storage, or removable storage such as a CD-ROM)—which may be pre-stored when the phone is purchased by a consumer, as stated above, or which the consumer may selectively load onto the phone (from his own music CD collection, perhaps, or from a subscription service); selection means for selecting what to send (which may comprise accepting the caller's input in one or more ways, or automatically or programmatically making a selection without the caller's input, as has been described); and means to transmit the caller's selection to the receiver. The transmission means may be simply the concurrent phone call, whereby the background or audio file contents may be played as the caller is speaking. Alternatively, the background or audio file contents may be suppressed from the caller's hearing: the file can be mixed with the caller's speech and transmitted, without being played out.

As an option to transmitting the file as the caller speaks, the file may alternatively be transmitted before the caller's message. In situations which do not involve person-to-person conversation, the file may even be transmitted after the caller's spoken message, or the transmission may be intermingled between spoken segments of the message. Transmitting files after the caller has completed his spoken message is particularly beneficial when a large file, or a file of relatively long duration, is to be transmitted. Furthermore, rather than requiring the caller to stay on the phone during the transmission, in one embodiment the phone may be adapted to keeping the connection alive even though the caller has hung up (or otherwise indicated the end of his phone call), in a manner similar to use of a "hold" button on an office phone of the prior art, and then playing the file for recording by the receiver (and breaking the connection when the transmission is complete).

Note that many voice mail systems have restrictions on the duration of a permitted message. It may therefore be necessary to truncate a file to be used as a background sound before (or during) its transmission. Furthermore, a background file may be of longer (or shorter) duration than its corresponding message (or message segment). Refer to the description of message playback (as illustrated by FIG. 8), below, for a discussion of accommodating background files in these situations.

To optimize the separate transmission of the background or audio file, its contents may optionally be compressed, using compression techniques which are known in the art, in order to reduce the time required. The compression capability may be provided by the phone, or alternatively, the phone may transmit files that have previously been compressed.

Furthermore, the phone may have the capability for dynamically loading new files that may be used in subsequent messages (as mentioned above). For example, a separate connection (such as a Universal Serial Bus, or "USB", connection) may be provided, whereby the phone is operably connected to a computer or other device on which background and/or audio files have been stored. This device may then be used to transmit background and/or audio file contents to the phone for subsequent use with voice mail messages. Phones are known in the art which combine voice capability with MP3 sound transmission capability. See, for example, the discussion at http://www.wirednews.com/news/print/0,1294, 39271,00.html, which describes a new use for cell phones as portable music-reception devices. However, to the best of the inventors' knowledge and belief, this is an either-or approach where the phone may be used as a phone or as an MP3 receiver/player, but not both at the same time, and the inventors believe that it is not known in the art to enable a caller to selectively combine music files with his spoken message as disclosed herein.

In some embodiments, background or audio file content may be provided at the telco, and mixed into the voice mail message. That is, the caller preferably transmits an identification of a file to the telco, and the telco locates a file corresponding to this identifier, mixes the file contents with the voice message, and transmits the result to the called party (or her VMS). Several approaches may be used for providing this functionality. In one approach, the caller dials a special number at the telco, where that number corresponds to a system that is adapted for bridging to the proper called party (e.g. using a voice response unit). In another approach, the telco system may be adapted to listen for a command (such as a "*" key pressed during a call), and to invoke a type of specialized 3-way calling feature in response whereby the additional "party" conferenced in by the telco is now the playout of the background or audio file, rather than an additional voice stream. As yet another approach, the caller's telephone may be modified to send a triggering signal to the telco, which the telco system is adapted for receiving and then acting upon. Or, the telco—which knows the caller's phone number—can access stored preferences for this caller using that phone number. (In some cases, the VMS may also use this latter technique for obtaining a caller's preferences.)

There are also a number of alternative embodiments for the manner in which a stored voice mail message with associated background file(s) and/or embedded audio file(s) is played back to the listener (i.e. the called party). When the caller has transmitted an identification of the file, but not the contents of the file, then some entity is responsible for locating the content, as has been discussed above. This responsibility may be placed upon the receiving VMS, the telco, or perhaps the called party's phone (or, alternatively, one or more such entities may share the responsibility). The located content must then be mixed with the voice mail message (except in the case of an audio-only message). This mixing may also be performed in a number of different ways. The mixing may be done by the receiving VMS as the message is being received and recorded, or by the telco as the caller's message is transmitted to the VMS for recording (e.g. by conferencing a background sound onto the appropriate phone line). Or, the VMS may mix the message as it is being played to the listener. As another alternative, the VMS may mix messages at any time between receiving (and recording) thereof and playing the message to the listener. (For example, a mixing operation may be periodically invoked that will search for stored messages which have not yet been mixed.) Or, the telco may mix the message as it is being played for the listener (or at an arbitrary time, if the message is stored at or accessible to the telco), or the listener's phone may perhaps do the mixing if it is appropriately adapted. As yet another alternative, the caller's phone may do the mixing, such that the VMS receives an already-mixed message. (In this latter case, the caller may perhaps explicitly request the mixing operation, or the caller's phone may be adapted such that it automatically initiates the mixing.)

Note that several embodiments described herein require modifications to telephones used by the caller and/or the called party, whereas other embodiments localize changes to non-consumer systems such as the VMS and/or telco. Implementations falling within the first of these categories are preferably backward-compatible, such that telephones which do not implement the techniques of the present invention are also supported.

As an alternative to mixing the file(s) with the recorded voice mail message prior to delivery to the listener, the VMS or telco may alternatively "mark" the message. That is, a process may be performed that associates the background or audio file(s) with the voice mail message, yet does not physically mix them. The mixing then preferably occurs as the message is being played to the listener.

Reference is now made to the accompanying drawings, which will be used to illustrate operation of preferred embodiments in more detail.

FIGS. 1A through 1F illustrate how a voice mail message may be enhanced by selecting one or more background sound files to be mixed with the voice message upon playback to the called party, where these background sound files are selected from choices that are available at the receiver (i.e. the system with which the caller is communicating). These figures differ in when the background sound file is selected, how many sound files are selected, and how changes in background sound are handled by the receiver. Each of these figures will now be described.

In FIG. 1A, the caller 100 dials a number (which may be the called party's number, or perhaps a voice mail service to which the called party subscribes), as shown at 102. The call is answered 103 by the VMS 101, and the message recording starts 104. At some point (in the preferred embodiment shown in FIG. 1A, at the start of the message, before the caller begins speaking), the VMS prompts 105 the caller for his background choice. The caller then chooses a background, or chooses not to use a background, which may be done (for example) by using DTMF tones as shown at 106. (Alternatively, the caller's selection may be made prior to dialing the called party's number, or before the call is answered, without waiting for a prompt from the VMS. This pre-selection may occur, for example, by use of a default or preference of the caller, or perhaps through an explicit action taken by the caller. It will be obvious how the scenarios depicted in the examples may be modified for such alternatives.) The VMS saves this selection internally 107. (Note that the receiving VMS preferably does not store the sound of the DTMF tones for the called party to hear, but rather stores them for further programmatic processing.) The structures that may be used for internally storing this information will be described below, with reference to FIGS. 9A and 9B. The caller then begins speaking his voice message (108), and hangs up 109 when he is finished. The VMS then stops recording for this message (110).

Note that while the example scenarios provided in the figures refer to use of DTMF tones and program buttons, this is for purposes of illustration and not of limitation. Alternatively, any suitable technique for supplying input from the caller, including use of voice recognition by the receiving VMS to interpret the caller's spoken selection(s) or command (s), may be used instead.

Figure 1B:
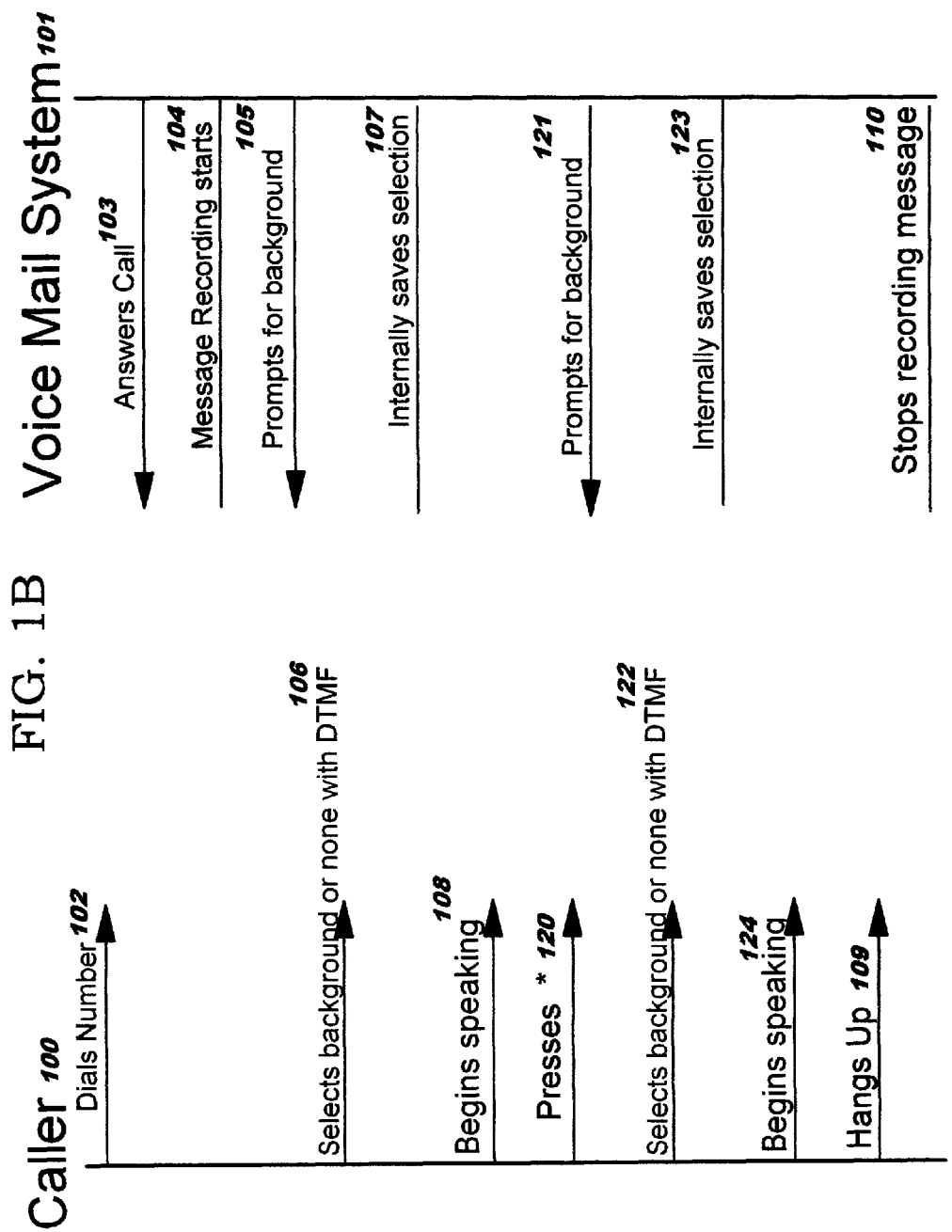

The interactions shown in FIG. 1B are identical in elements 102 through 108, whereby the caller 100 initiates the phone call, selects a background sound in response to a request from the VMS, makes his selection (which is recorded by the VMS), and then begins speaking. At some point after the caller has been speaking his message, he elects to change the background sound. Preferably, he indicates his desire to make this change by pressing a predetermined key sequence that sends a DTMF tone as a signal to the VMS, such as the "*" key (as shown at 120 in FIG. 1B). The VMS then preferably prompts 121 the caller again, for his new background choice. The caller may now choose a different background, or he may choose to have no background for his upcoming message segment, which is preferably conveyed by using DTMF tones as shown at 122. The VMS saves this new selection internally (123). The caller then continues speaking his voice message (124). He may repeat the process of changing his background sound more times (not shown in FIG. 1B), if desired, and eventually hangs up 109 when he is finished, causing the VMS to stop recording for this message (110).

Figure 1C:
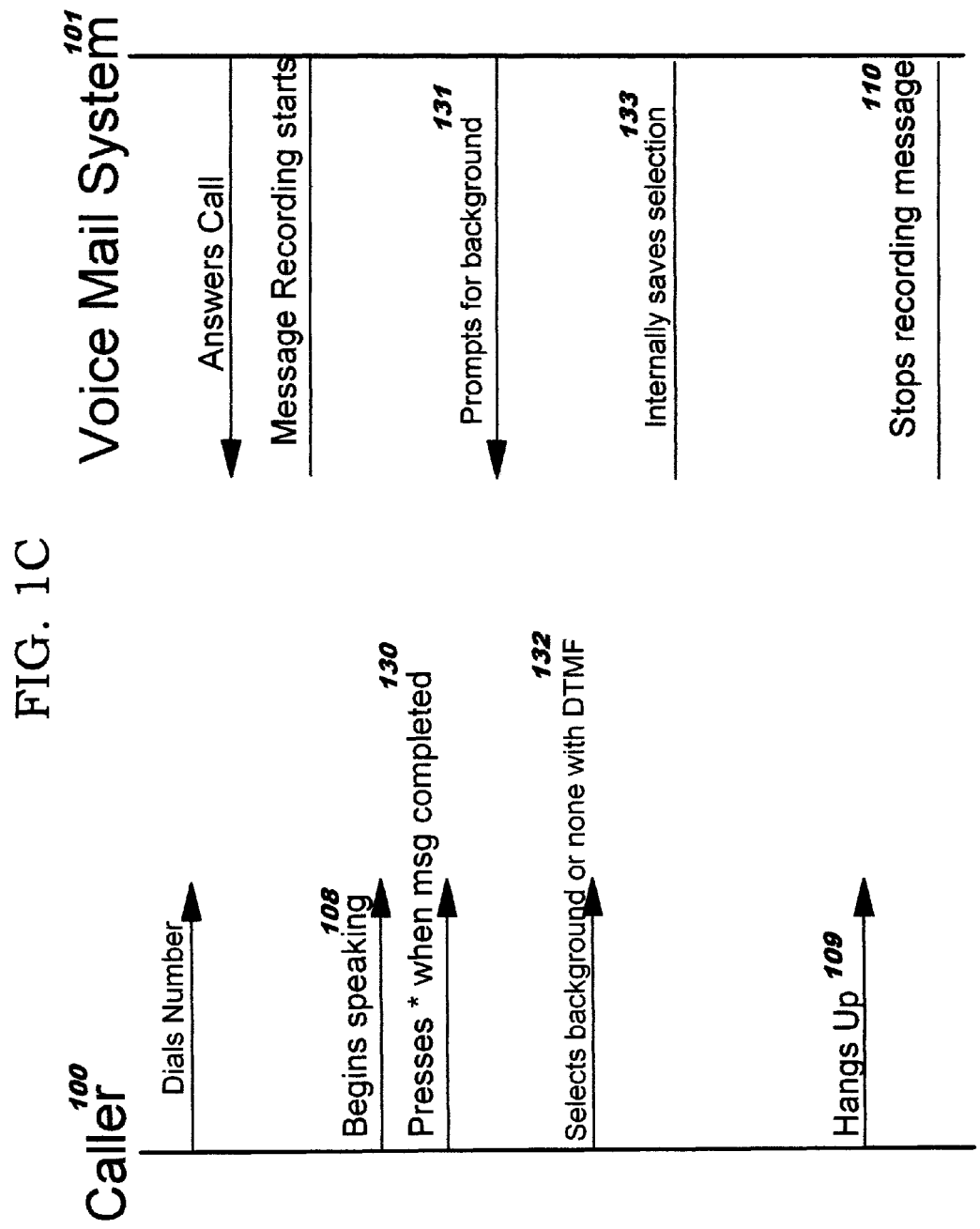

FIG. 1C depicts a process for leaving a message with a background sound that is similar to FIG. 1A, but differs in the timing of making the caller's selection. In FIG. 1C, the caller 100 first speaks his entire message (108), and then preferably presses a key sequence that sends DTMF tones to the VMS to indicate that he would like to select a background sound (as shown at 130). (Alternatively, the VMS 101 may be adapted to always request selection of a background sound upon completion of a message, rather than requiring an explicit input signal from the caller.) Upon receiving the caller's indication, the VMS then sends the selection prompt 131, which the caller answers at 132 in a manner similar to that described for FIGS. 1A and 1B. The VMS then saves the selection (133), and the call ends (109, 110).

The interactions shown in FIG. 1D are similar to those in FIG. 1C, except that the caller elects to change the background sound during his message. These interactions differ from FIG. 1B, where the caller made each new background selection before speaking the corresponding segment of the message: in FIG. 1D, the caller 100 selects each background after he has finished the corresponding message segment. Similar to FIG. 1C, the caller preferably indicates his desire to request a background by pressing a predetermined key sequence that sends a signal to the VMS, which is represented in FIG. 1D as the "*" key (as shown at 140). The VMS then prompts 141 the caller for the background to be associated with the first message segment, which has just been recorded. The caller chooses a background, or chooses to have no background for this segment (142), and the VMS saves this selection (143). The caller then begins speaking again (144), for the next segment of his message. If he wishes to change the background again, before his voice message is complete, he again presses the key sequence to send a signal to the VMS, which is followed by the prompting, selecting, and internal storing steps (not shown in FIG. 1D). Once the final message segment has been spoken, the caller may press the key again (145) to select the background for this final segment. (Alternatively, he may omit this step in some embodiments, causing the VMS to record a choice of "no background".) The VMS prompts 146 the caller for this (final) background selection, which he signals 147 using the DTMF tones. The VMS records this selection (148), and the caller then hangs up (109), causing message recording to stop (110).

Figure 1E:
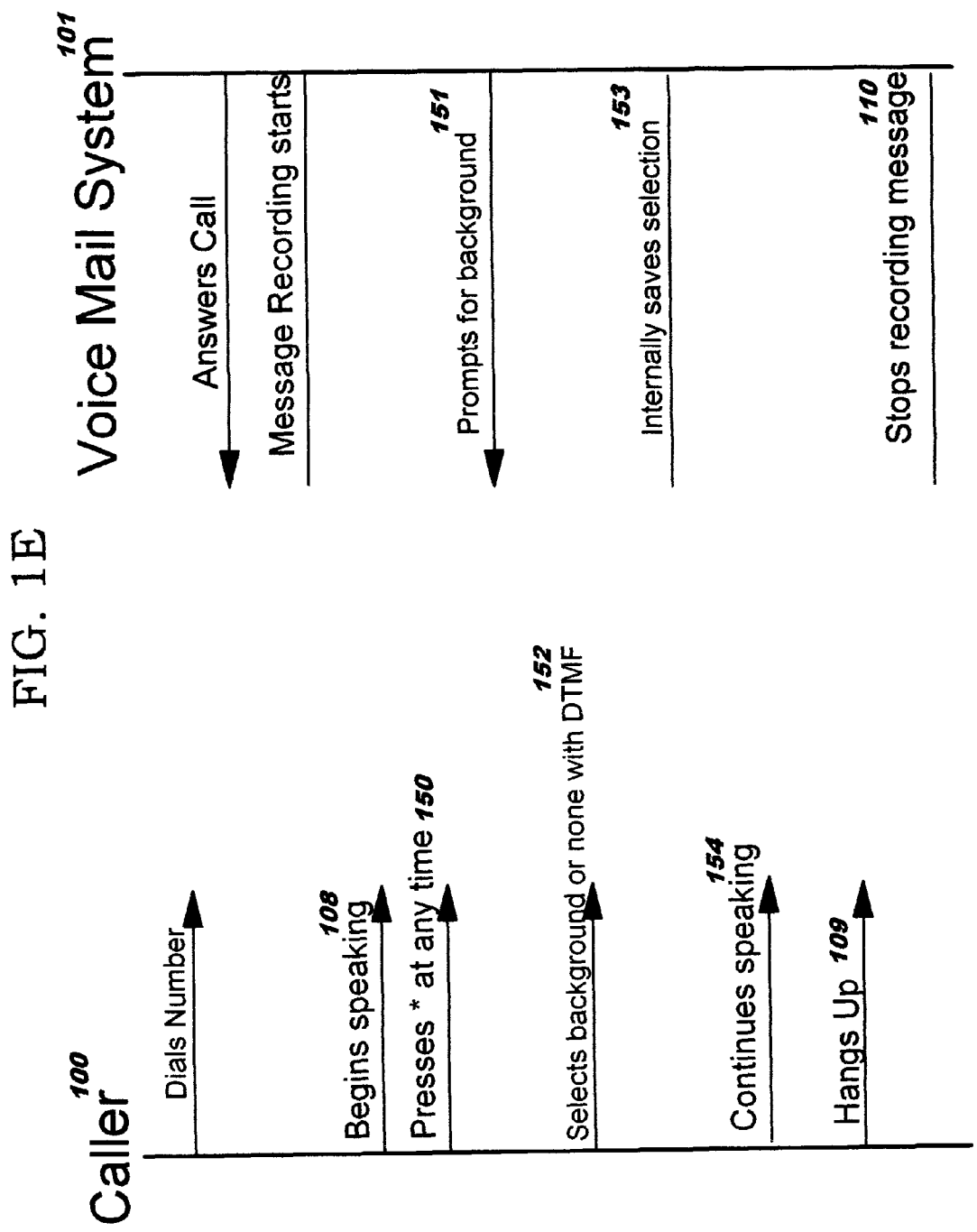

In the embodiment illustrated in FIG. 1E, the caller 100 may select a background sound at any arbitrary time during recording of a voice mail message. As shown at 108, the caller has already started speaking his voice mail message, and at some point decides to select a background (as shown at 150, again using a predetermined key sequence such as "*" to signal the VMS 101 that the caller wishes to choose a background). As in the previous interactions, the VMS preferably prompts 151 the caller for his selection, which is conveyed using DTMF tones (152). This selection is then recorded (153). An implementation of the present invention may choose whether the background now selected applies to the already-recorded message, or to the upcoming message, or perhaps to the entire message. In any of these cases, the caller continues speaking (154), and when he is done, the caller hangs up (109) and the VMS stops recording (110). Or, the caller may make his selection 150, 152 at the end of his message, in which case he does not continue speaking. Furthermore, an implementation may provide the capability for the caller to select a background when none had been selected earlier, and/or to replace a previously-selected background (not shown in the figures), in a similar manner to prior art voice mail systems which allow a caller to listen to her recorded message, delete, and then re-record the spoken message.

The embodiment illustrated in FIG. 1F allows the caller 100 to select multiple background sounds, each requested at arbitrary points during the voice mail message. Again, the caller may press a key sequence such as the "*" key at any time (shown at 150 in FIG. 1F), in the same manner described for FIG. 1E. The selection process is also analogous to that used for FIG. 1E (and the background selection may again apply to the prior or the subsequent segment of the voice mail message, or to the entire message, as desired for a particular implementation of the present invention). (When the changed background is to apply to the entire message, any previously-selected background information is preferably overridden or discarded.) Now, however, after the caller continues speaking (154), instead of hanging up as shown in FIG. 1E, he may press a different key sequence (shown as the "#" key at 160 in FIG. 1F) to explicitly indicate the boundary of a new message segment. In response to receiving the DTMF tone corresponding to this "#" key, the VMS 101 now saves a segment marker (161). (A data structure that may be used to store messages with segment markers is described in more detail with reference to FIGS. 9A and 9B.). The segment marker may comprise a pointer or other indicator to where this segment begins. Note, however, that the caller is not selecting a background sound at this point. Preferably, a segment marker is used to indicate a change from using one background file to using another. Or, the background file that was in effect in response to request 150 may continue across this change in segments. In the former case (i.e. when the background sound is affected by the segment marker), when the implementation is associating background file selections with previously-recorded message segments, then this is an indication that the message segment that has now been ended by request 160 is to use the background selected at 152; or, if the implementation is associating background files with upcoming message segments, then request 160 is an indication that the upcoming segment (which begins at 162 and continues until the caller hangs up) is to use the background selected at 152. The remaining interactions in FIG. 1F are similar to those which have been described for FIGS. 1A through 1E. (Segment markers are also discussed in the related invention "Recording and Receiving Voice Mail with Freeform Bookmarks".)

While not illustrated in FIGS. 1A through 1E, a particular receiving VMS may choose to provide a multi-tier menu when offering background selections. For example, a first DTMF tone may signal the caller's choice of easy listening as opposed to hard rock or other offered categories; upon receiving this first response, the VMS may offer specific selections within that category. In such multi-tier approaches, a fast-path response may optionally be supported, whereby the caller (or his phone) enters enough responses (such as multiple DTMF tones or perhaps through recognized voice commands) to navigate more than one tier of the menu at a time (including supplying a complete navigation path with a single response).

It will be obvious to one of ordinary skill in the art how the interactions that have been depicted can be adapted to a multi-tier approach.

In the cases where the background is selected prior to the caller speaking, there is preferably no explicit requirement that the caller actually speaks following his selection. If the caller chooses not to speak at all, then preferably (1) the corresponding background selection is not stored in cases where the message has multiple segments (some of which contain a portion of a spoken voice message) or (2) an indication may simply be provided that a message was left (or that a call was received) from this particular caller when there is no spoken message content at all. This latter case is similar to the approach taken by prior art voice mail systems, which store the name (and perhaps the calling number, date, and time) for incoming calls.

Figure 2A:
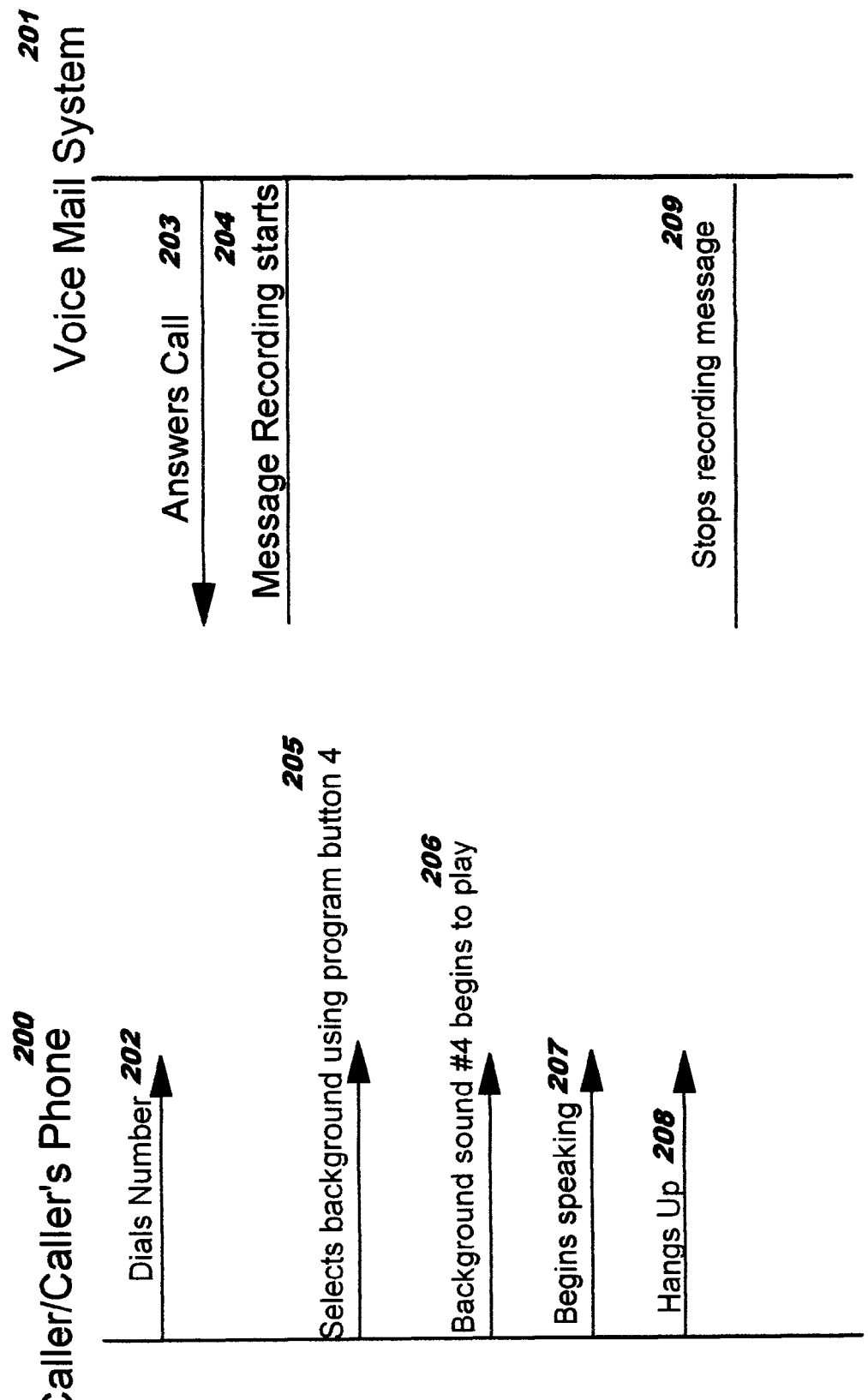

FIGS. 2A through 2C illustrate enhancing a voice mail message by selecting one or more background sound files to be mixed with a subsequently-delivered message, where the selected background files are provided from the caller's telephone. FIGS. 2A and 2B differ in how many sound files are selected, and FIG. 2C illustrates the processing at the caller's side of the connection in more detail. Each figure will now be described.

In FIG. 2A, the caller 200 dials a number (which again may be the called party's number, or perhaps a voice mail service to which the called party subscribes), as shown at 202. The call is answered 203 by the VMS 201, and the message recording starts 204. At some point (in the preferred embodiment shown in FIG. 2A, at the start of the message, before the caller begins speaking), the caller selects a background file (as shown at 205). For purposes of illustration, suppose the caller makes his selection by pressing a "program button 4". A background file that is associated with this program button then begins to play (206). Preferably, the caller begins speaking soon thereafter (207), and the background sound continues to play until such time as the caller hangs up (208). When the caller hangs up, the VMS also stops recording (209).

As stated earlier, alternative selection means for the caller to select his background choice at 205 include use of a touch-sensitive screen, or perhaps a default background file is programmatically selected at 205 without intervention by the caller. And instead of playing the selected file, the caller's phone may simply send the selection (e.g. as a compressed file) or an indication thereof (e.g. by sending a selection number or URL). Furthermore, multi-tier selection systems (of the type previously described, where one or more tiers of sound categories must be navigated before selecting an individual file) may be accommodated; in this case, the selection action shown at 205 preferably comprises navigating through this multi-tier selection system until reaching a particular file selection (or, alternatively, until the caller selects a particular type or category as his background choice).

The interactions shown in FIG. 2B are similar to those described for FIG. 2A, except that the caller is now selecting multiple background files. As in FIG. 2A, the caller 200 makes a connection (202, 203) to the VMS 201, and message recording starts (204). In this example, the caller's first background selection is shown using (by way of example) a "program button 1" (or equivalent selection means), as shown at 210. This background selection begins to play (211), and the caller begins speaking (212). At some point during the voice mail message, the caller decides to change his background sound, and thus in this example he presses "program button 2", as shown at 213. This causes the previous background selection to stop (214), and the new selection now begins to play (215). The caller again starts speaking (216), preferably shortly after selecting the new background. This process of selecting a new background sound, changing the background sound that is being played, and re-starting the voice mail message may be repeated (not shown in FIG. 2B) as desired by the caller. When the caller is finished, he hangs up (217) and the VMS stops recording (218).

Note that the approach used in FIGS. 1C and 1D, where the caller selected his background choice after leaving the corresponding voice mail message, is not readily adaptable to the scenarios depicted in FIGS. 2A and 2B in which the background selection is played from the caller's phone along with the spoken message. (However, when a background file or identification thereof is sent separately from the caller's spoken message, then background files may be selected for a spoken message or message segment and may be transmitted before, after, or perhaps during the spoken message, as stated earlier.)

FIG. 2C illustrates the timing and interactions between the caller 220 and his phone or phone system 221. (Note that references herein to a "phone" or "phone system" are for purposes of illustration and not of limitation: devices which provide analogous functions, whether or not those devices are considered to be a typical phone, may be used alternatively without deviating from the inventive concepts disclosed herein.) As shown at 222, 223, the phone preferably performs normal (prior art) call setup operations to establish a connection (224) to the called party (i.e. to the receiving VMS, which serves as a surrogate for the called party). (The called party or call receiver has not been shown explicitly in FIG. 2C. Arrows pointing from the phone system 221 toward the right of the chart are intended to represent interactions with the called party.) The caller selects background sounds (225, 228), and his phone begins playing a sound file (226, 230) to the called party in response. (The sound file may also be heard by the caller, as indicated by the dashed section of arrow 226.) Furthermore, a change in background sound that is requested by the caller (228) causes the phone to stop using the prior background sound (229). The caller speaks into his phone (227, 231), causing the phone to transmit his voice to the called party (not shown in FIG. 2C), preferably using prior art techniques. And finally, when the caller hangs up (232), normal prior art call disconnect operations are preferably performed (233) by the phone to take down the connection to the called party.

While the figures that have been described show the background sound as being selected and starting to play at some particular time, other variations may be provided instead of (or in addition to) those shown. For example, rather than waiting for a call to be established prior to selecting a background file in FIGS. 2A through 2C, the caller may instead pre-select the background before he dials the number. Additionally, the initial background selection might start to play immediately after the number is dialed, or when the call is connected to the receiver, or when a party (such as an automated VMS) answers on the other side of the connection, or perhaps not until the caller begins speaking. Alterations to the figures to support these alternatives will be obvious to one of skill in the art.

Note that while FIGS. 2A through 2C (and FIG. 5, to be described below) indicate that the background sound "plays" from the caller's side of the connection, this does not necessarily mean that the caller hears the playout of the selection, as was stated earlier.

Figure 3:
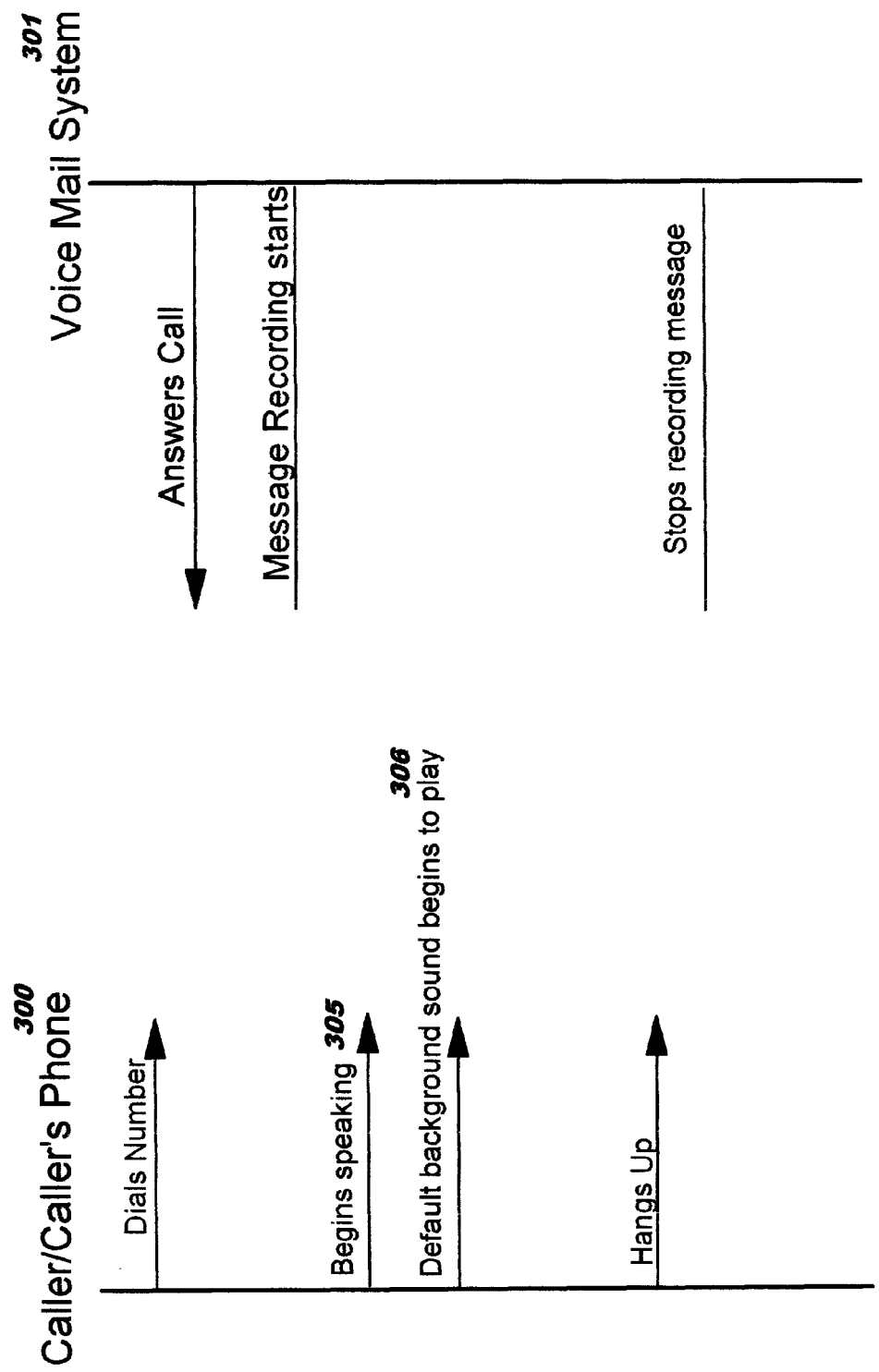
FIG. 3 is a flow diagram illustrating how a caller may enhance a voice mail message through use of a predetermined background sound that is provided from the caller's telephone, according to preferred embodiments of the present invention.

FIG. 3 illustrates enhancing a voice mail message by providing a default or predetermined background sound. This process is similar to that shown in FIG. 2A, except that now there is no requirement for the caller 300 to explicitly select his background choice. Instead, he simply begins speaking (305) after the call with the VMS 301 has been set up, and the default background plays automatically (306). In an analogous manner to that just discussed, the default background selection might start to play immediately after the number is dialed, when the call is connected to the receiver, or when a party (such as an automated VMS) answers on the other side of the connection, or (as shown in FIG. 3) perhaps not until the caller begins speaking. Furthermore, the particular default selection to use may be determined in a number of ways, such as from the single selection available on a caller's phone, or by evaluating conditions stored in the caller's profile, and so forth, as discussed earlier.

Figure 4A:
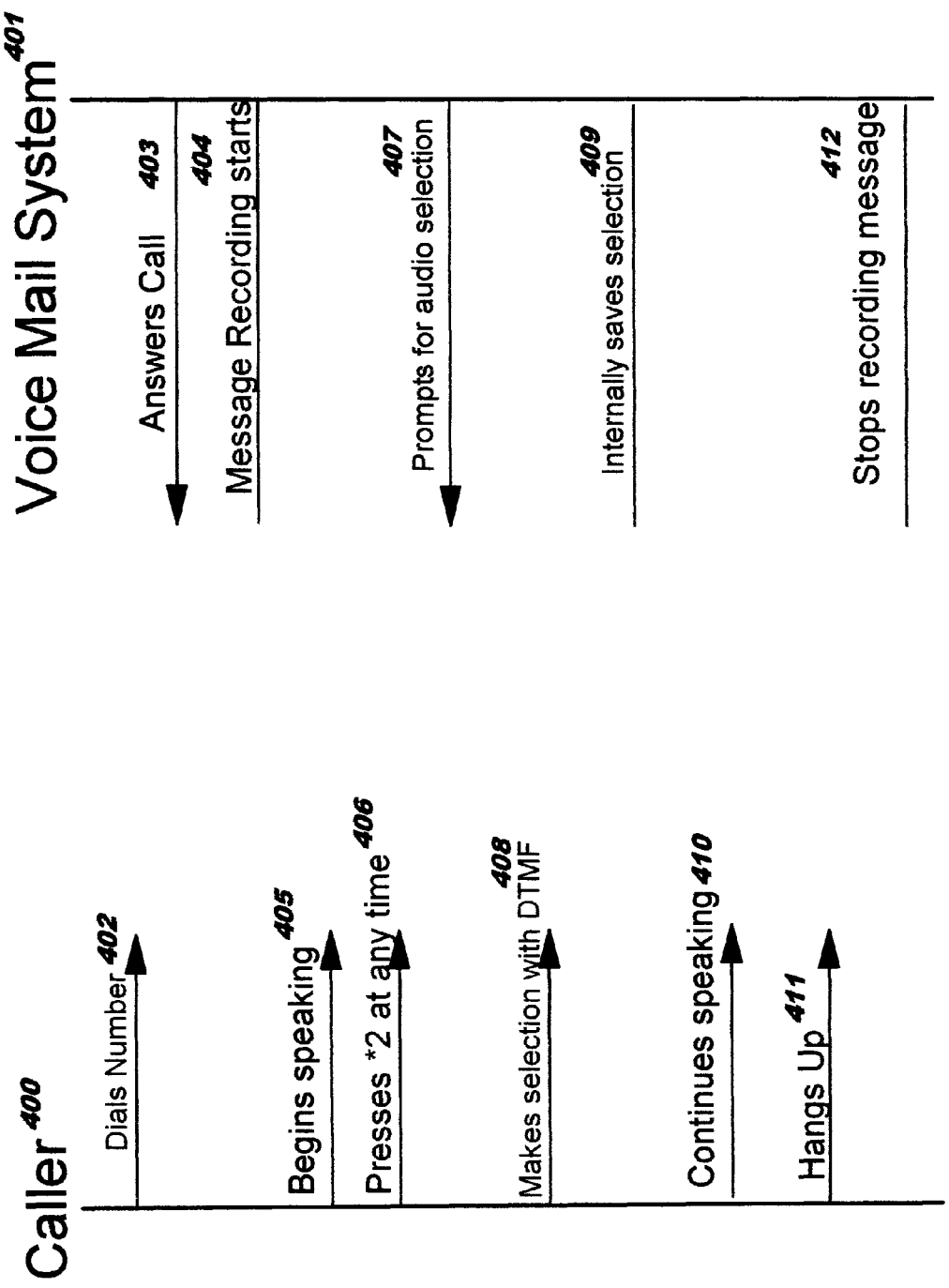
FIGS. 4A and 4B are flow diagrams illustrating how a caller may enhance a voice mail message by selecting one or more audio files that are offered by a receiving system, where these audio files are to be inserted into a voice mail message, according to preferred embodiments of the present invention.
Figure 4B:
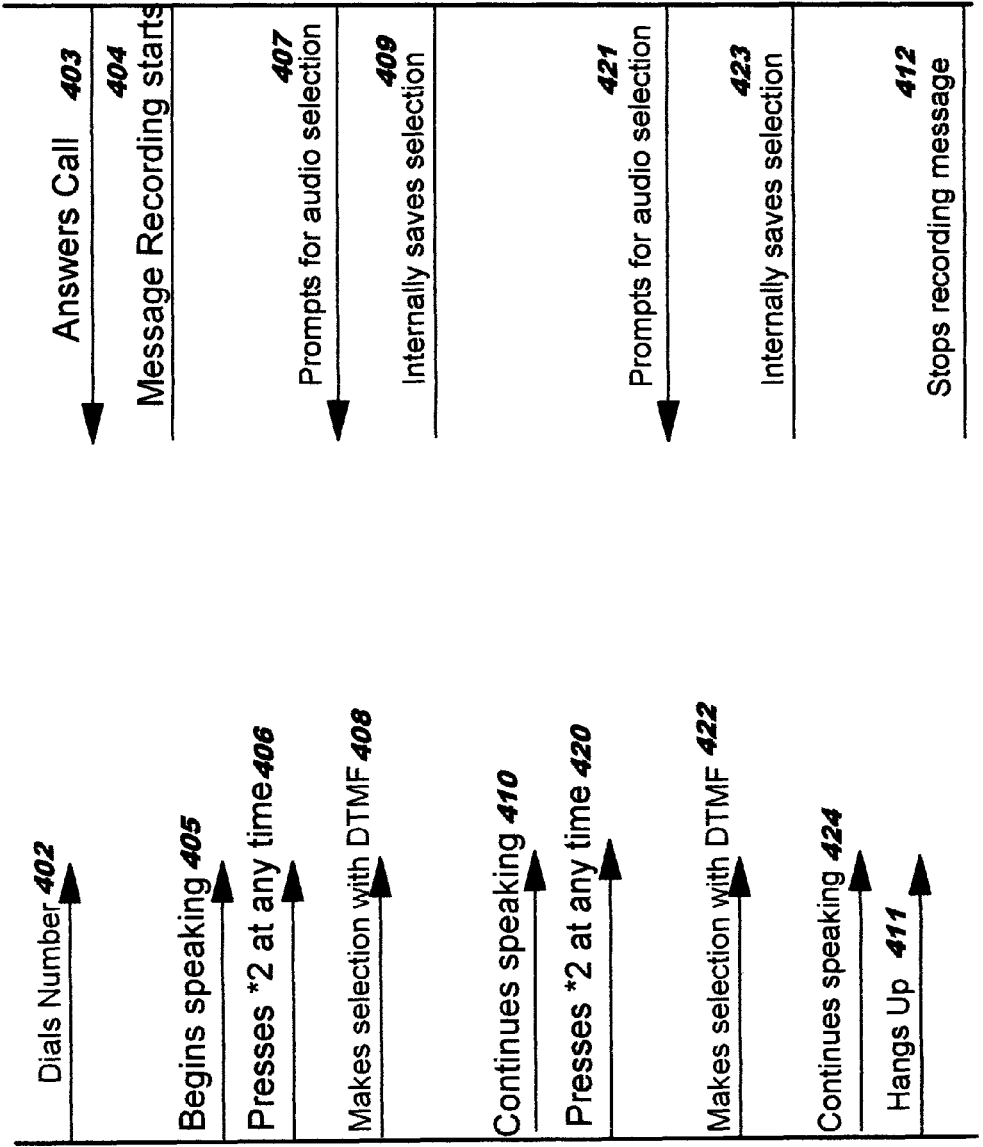

FIGS. 4A and 4B illustrate enhancing a voice mail message by selecting audio files that are to be embedded within that message upon playback to the called party, where these audio files are selected from choices that are available at the receiver. These figures differ in how many audio files are selected by the caller.

Note that the selections used in FIGS. 4A and 4B are audio files, not background sounds. Often, the selected audio file will be a music selection. The caller might choose to leave an audio-only message, without any accompanying voice message. Or, the selected audio files might be intended for embedding within a voice message, which may or may not have background sound associated therewith. (FIG. 9B illustrates a data structure that may be used to store these various combinations of information at the receiver. As stated earlier, background sounds and audio files are preferably not overlaid during playback to the listener, nor are they preferably overlaid on the caller's side of the connection when the files are being delivered from the caller.) In implementations where combinations of background and audio files are supported, the caller might be presented with a selection such as "enter 1 to request an audio file or enter 2 to request a background file", when using the prompting approach of FIGS. 1A through 1F; or, when the caller initiates a selection (such as that shown in FIGS. 2A through 2C, as well as FIGS. 4A and 4B and FIG. 5), a separate keystroke sequence or button may be provided that indicates whether what the caller now wishes to select is a background file or an audio file. Furthermore, fast-path selections of the type previously discussed may be provided, such that the caller not only selects the type of file he will be identifying but also provides the identification thereof in a single input sequence.

In FIG. 4A, the caller 400 dials a number, as shown at 402, thereby establishing a call (403) with the VMS 401, and message recording starts (404). At some arbitrary time during the voice message (405), the caller requests (e.g. by pressing a key sequence that signals the VMS, as shown at 406) to select an audio file for embedding in the voice message. The VMS thus prompts 407 the caller for his audio file choice. The caller then chooses the audio file, which may be done by using DTMF tones as shown at 408 (or he may choose not to select an audio file, alternatively, by making a null selection using an appropriate key sequence). The VMS saves this selection internally 409, for subsequent playback between the first and second segments of the voice message. (As in the case of background file selections, the receiving VMS preferably does not store the sound of the DTMF tones for the called party to hear, but rather interprets them and may store them for further programmatic processing.) The caller then continues speaking his voice message (410), and hangs up (411) when he is finished, causing the VMS to stops recording (412).

The interactions shown in FIG. 4B are identical in elements 402 through 410, whereby the caller 400 initiates the phone call, requests selection of and then selects an audio file, with prompting by the VMS (which records the selection), and then continues speaking. At some subsequent time, the caller requests (420) to embed another audio file into his voice mail message. The process for selecting this next file to be embedded, shown as elements 420 through 423, is identical to that described with reference to interactions 406 through 409. After the audio file has been selected, the caller may begin speaking again (424) if desired. Additional audio files may be selected (not shown in FIG. 4B) if desired. Once the caller has finished his message, he hangs up (411) and the message recording stops (412).

While not shown in the figures, the caller may choose to use background sounds and audio files within a single voice mail message. It will be obvious to one of skill in the art how the figures may be adapted for this situation.

Figure 5:
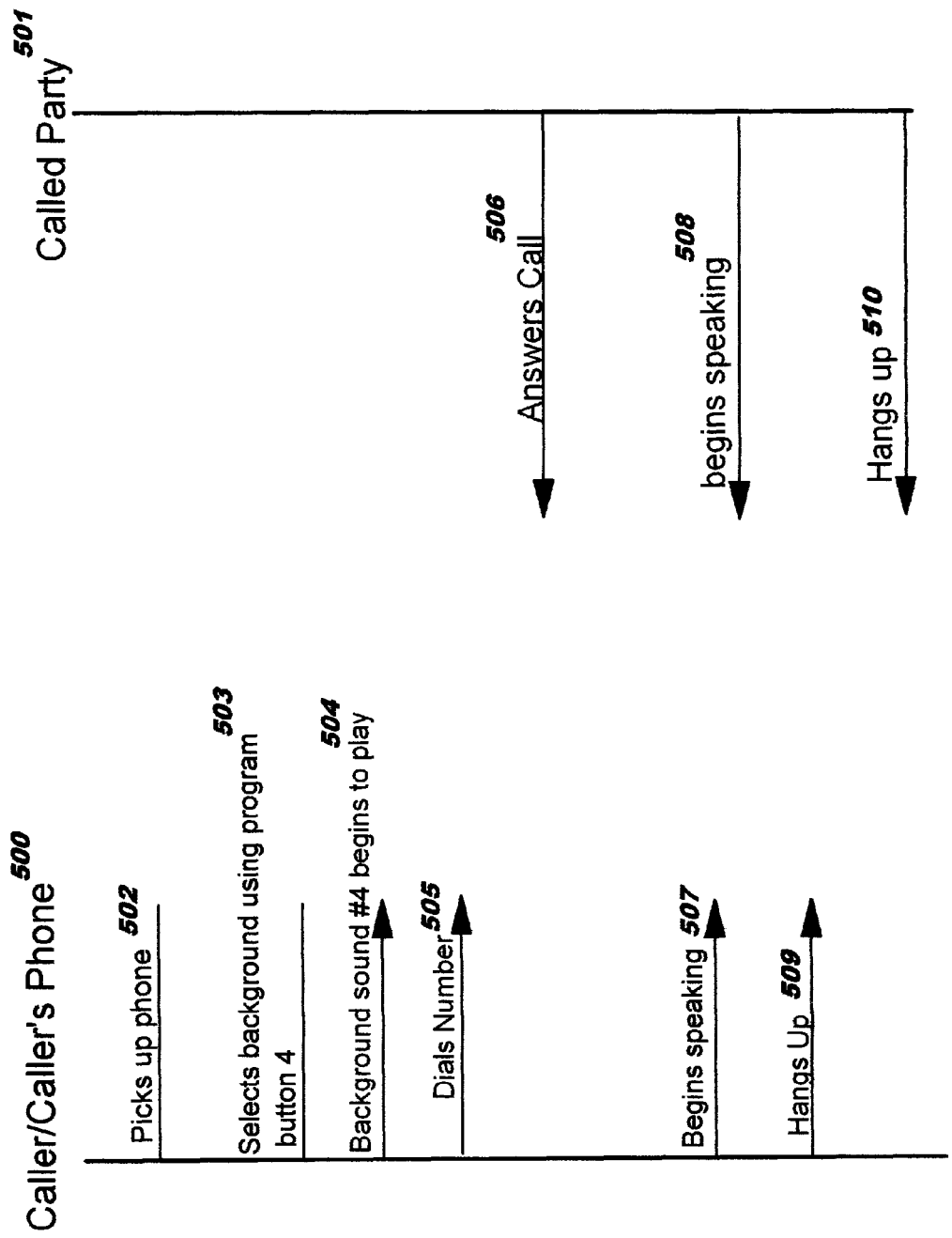
FIG. 5 is a flow diagram illustrating how a caller may enhance a telephone conversation by selecting one or more background sounds that are provided from the caller's telephone, according to preferred embodiments of the present invention.

FIG. 5 illustrates enhancing a person-to-person telephone conversation between the caller and called party by using background sounds. In the illustrated embodiment, the background sounds are transmitted from the caller's phone, in a similar manner to that which has been described above with reference to FIGS. 2A though 2C and FIG. 3.

In this embodiment, the process begins with the caller 500 picking up his phone (502) and then selecting a particular background sound (503) using, for example, a key sequence or a predefined button (shown in the example as "program button 4"). The selected background sound (which may be, for example, the caller's personal "theme song") may begin to play before the caller dials the number (505) of the called party 501. (Or, in alternative embodiments, the background sound may begin to play after the number is dialed, or while the caller is dialing, or perhaps only after the connection is established or the called party answers the call.) Optionally, an implementation may provide for use of a default background sound, or a background sound that is chosen programmatically without intervention of the caller, rather than requiring an explicit selection at 503. When the called party answers (506), the caller and called party then begin speaking (507, 508). Preferably, the caller's background sound plays throughout this conversation, until the caller hangs up (509), which may occur before or after the called party hangs up (510).

Figure 6A:
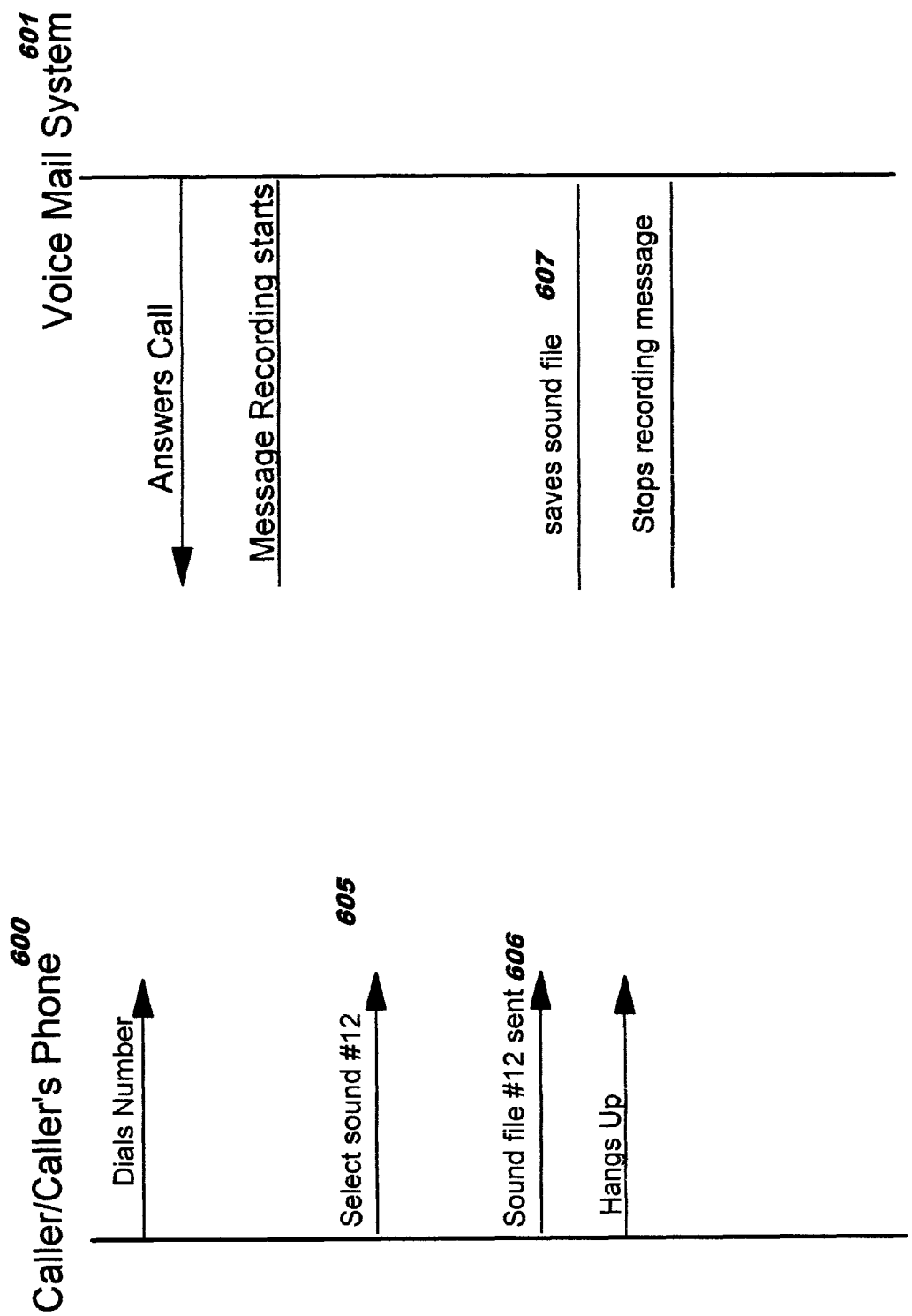
FIGS. 6A and 6B are flow diagrams illustrating how a caller may enhance a voice mail message by sending, from a telephone or calling system, a sound file or identification thereof (which may be used in place of a spoken message, or in addition to a spoken message), according to preferred embodiments of the present invention.
Figure 6B:
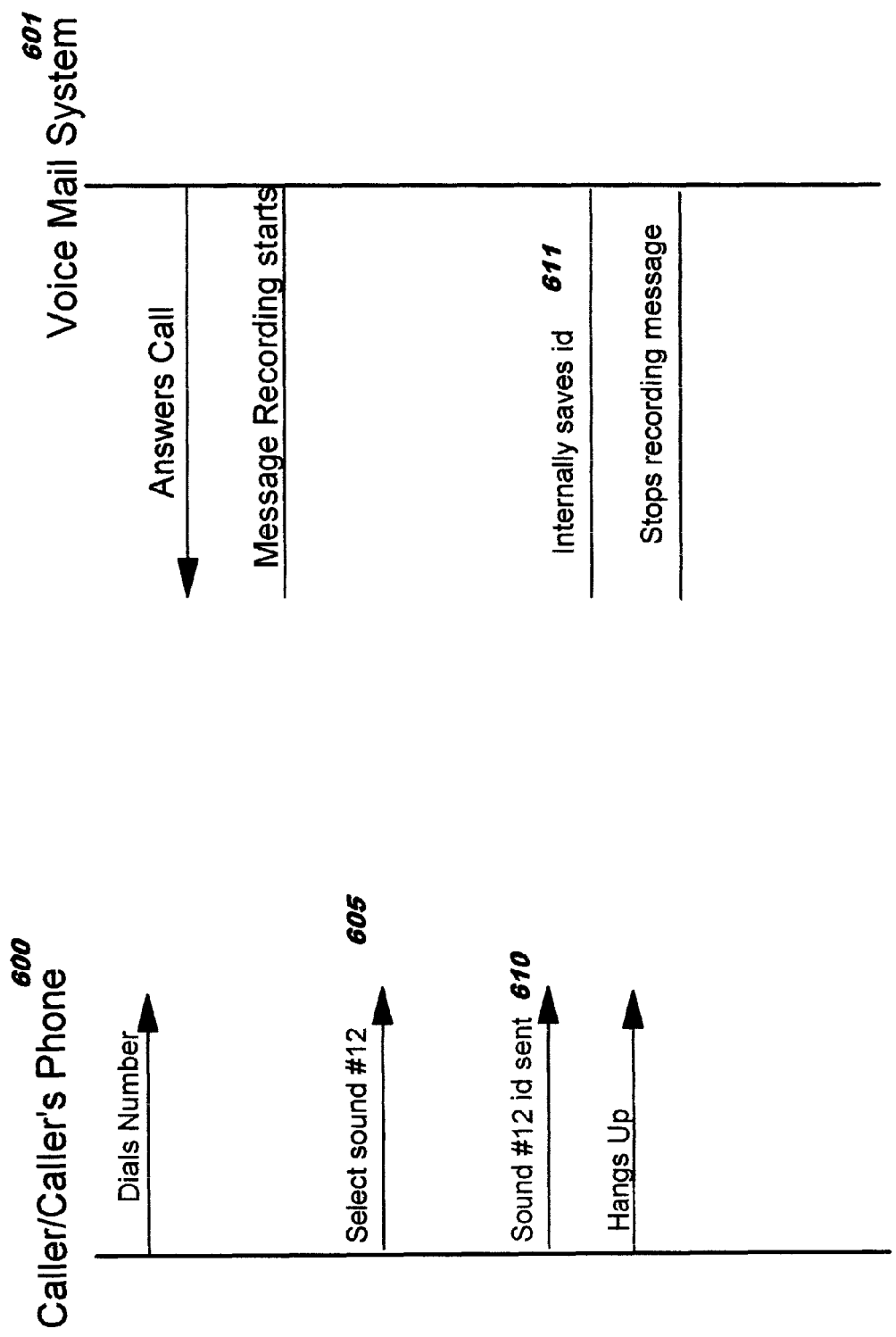

FIGS. 6A and 6B illustrate enhancing a voice mail message by sending an audio file (or an identification which can be used to retrieve the desired audio file) to a receiver, where this audio file may be used to supplement a voice mail message or perhaps as a substitute for a voice mail message. Preferably, this technique is used for audio signature messages (although this is for purposes of illustration and not of limitation). Audio signatures are preferably chosen by the caller, and may contain the caller's name, a short music file, or any other type of sound. An audio signature may be left as a message when, for example, the signature itself is sufficient to convey to the receiver that a particular person called. (The signature may also convey additional information, of course, depending on its audio content.) An audio signature may be provided with a voice mail message, perhaps at the beginning of the message (or stored separately from the message) for use in quickly identifying who the message is from. Suppose a particular individual has several messages stored in his VMS. He may choose to listen only to the audio signatures, as a way of "skimming" through his voice mail (in the same way a person skims through his conventional mail by looking at the outside of the envelopes). This provides a more efficient means of processing voice mail than listening to messages in sequence, and may also be more efficient than attempting to skim the messages by listening to the first few seconds of the message (in those cases where the audio signatures are available and are sufficient for this purpose).

FIG. 6A illustrates the caller 600 selecting (605) an audio file to be transmitted from his phone to VMS 601, causing his phone to send the identified file (606), which is then saved (607) by the VMS as the voice mail message. As illustrated in these figures, the caller may select the audio file using a sequence of characters, or alternatively may use other selection means such as a touch-sensitive screen; or, a default selection may be used, or a selection may be chosen programmatically (using, for example, a profile for this caller). FIG. 6B is similar, except that instead of sending a sound file, an identifier (see 610) of the audio file selected (605) by the caller 600 is sent to VMS 601, and this identifier is preferably stored (611) by the VMS.

Figure 7B:
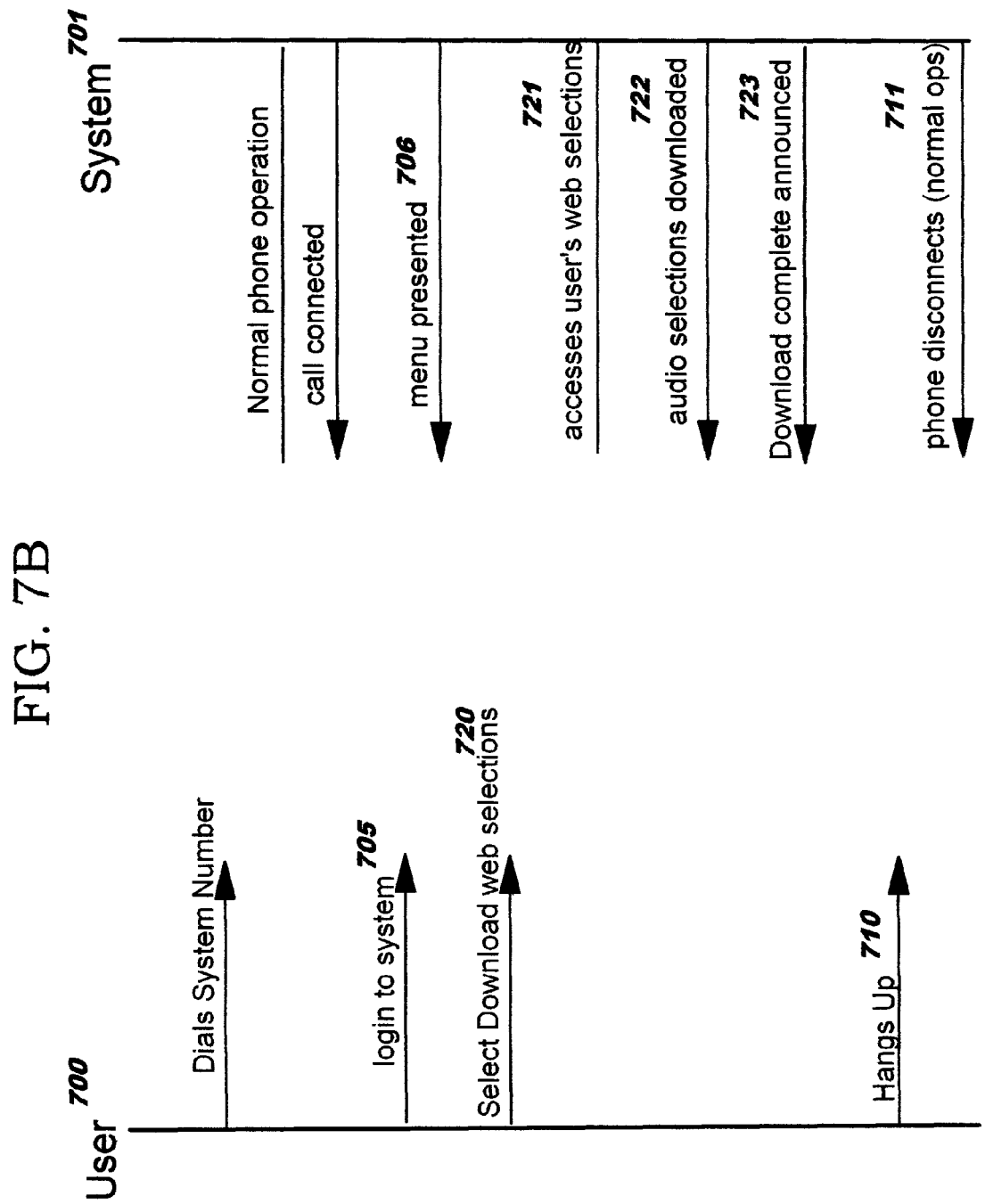

FIGS. 7A and 7B illustrate ways in which a background sound or audio file to be used with the present invention may be obtained and downloaded to the caller's phone or phone system. (As will be obvious, these illustrations are for purposes of illustration and not of limitation.) In preferred embodiments, the file(s) to be downloaded may be used with the scenarios depicted in FIGS. 2A through 2C, or in FIG. 3 or 5, as the selectable or default file(s) to be provided from the caller's phone.

As shown in FIG. 7A, the download process preferably begins with the caller 700 dialing the phone number (702) of a system 701 from which background sound and/or audio files can be obtained. The illustrated techniques may be used, for example, when the caller uses a pay-per-download service from a system 701, although system 701 may alternatively provide a subscription service or perhaps a free service. If the service requires payment of a fee, the caller may perhaps have an established account, which he uses to pay for his selections. In one possible model, the caller may be charged a flat rate to download all selections that are available, or in another model, he may be charged per selection. If the service requires payment of a fee, this fee may appear on the subscriber's phone bill.

Note that when fee payment is required when using the present invention, the fees are preferably paid by the caller. This includes cases where the caller's selection is retrieved by the VMS, for example, using a URL sent by the caller. This is consistent with the "Calling Party Pays" model that is standard in telephony, and is appropriate for the present invention because in some preferred embodiments, the called party has no opportunity to accept or decline receipt of particular messages or message segments by virtue of their having fee-related background or audio file content. In alternative preferred embodiments, however, the called party may be given the ability to suppress inserted audio files during playback and/or background sounds as well, provided the insertion or mixing has not already occurred. Or, a particular VMS may be adapted to suppressing such files. This ability to suppress background and/or inserted audio files may be provided as a selectable option on a per-call basis, or may be applied to all calls for a particular called party, or may be selectively applied based upon a called party's previously-stored preferences, and so forth.

After the connection is established (preferably using prior art call setup techniques as indicated at 703, 704), the caller preferably logs in (705) to the offered service, after which the system presents a menu (706) from which the caller can make his selection. The caller then selects (707) one or more files to be downloaded, and the download process begins (708). In some cases, the caller may be limited to what is available, rather than having a selection capability; or a selection may perhaps be made for the caller based on his previously-stored preferences. Once the download is complete (709), the caller preferably hangs up (710) and the connection is terminated (711) using prior art call disconnection techniques.

Instead of making a telephone connection to a file provider, files may be downloaded from a remote location such as the Internet. This alternative is illustrated in FIG. 7B, where caller 700 makes a telephone connection to a Web site (represented as system 701). As with FIG. 7A, the service may be a pay-per-download, subscription, or perhaps a free service (which may, for example, obtain its revenues through advertising on its menu selection page). Once a menu has been presented to the caller (706), he preferably selects one or more selections (720) to be downloaded from the Internet. The selections are then located (721), for example by following a selected URL, and downloaded (722) to the caller's phone or phone system. When the download of Web files is complete (723), the caller preferably hangs up (710) and the connection is terminated (711), as in FIG. 7A.

In another embodiment, the selection of the file to download may be made via an alternate device and a network. For example, the selection may be made by the subscriber by using a computer browser to access a Web page that provides a menu of selections. In this example, the subscriber preferably provides an identifier (such as a log-in password) to a server, selects a file from those offered, and the server then communicates to the service infrastructure the digital data to be downloaded. The download itself may perhaps occur during idle time, or during a call (or connection) to the service system intended for this purpose.

FIG. 8 provides a flowchart of logic that may be used in preferred embodiments to implement the playback of a voice mail message to a listener. This process begins at Block 800, which checks to see if there are any segments of the current voice mail message that have not been played. If this test has a negative result, then the playback is finished, and the processing of FIG. 8 ends. (When a message has not been divided into segments, then a negative result at Block 800 may indicate that the entire message has been processed from start to finish in one pass through the logic of FIG. 8.) Otherwise, when the test has a positive result, control transfers to Block 810 where the next segment of the current message is obtained. (The manner in which the segments of a message are located will be described in more detail below with reference to the data structures shown in FIGS. 9A and 9B.)

Block 820 then asks whether a background sound has been identified for this message segment. If not, then the message segment is simply played (Block 830), after which control returns to Block 800 to continue processing this message. If the test in Block 820 has a positive result, on the other hand (i.e. there is a background sound for this segment), then the background sound file is accessed (Block 840), and the background sound and voice message are played concurrently (Block 850). As has been discussed, the background sound may be identified with a URL or other identifier, or it may be provided as the contents of a file. (Furthermore, the mixing process may have already been performed prior to playback, in which case the logic of FIG. 8 is preferably used for that mixing process; the playback then comprises simply playing the already-mixed file.) After the playing of the current segment finishes, control returns to Block 800.

As previously noted, in some cases the background sound may be of longer duration than, or shorter duration than, the corresponding message segment. When the background sound is longer, it is preferably truncated once playback of the voice message segment completes. When the background sound is shorter, it may be allowed to end while the voice message continues to play; or, alternatively, the background sound may be "wrapped" such that it repeats as many times as necessary until the voice message segment playback is complete.

There may perhaps be short breaks in the continuity of a message that is created by mixing segments of voice with segments of background or sound files, for example due to the time it took the caller to identify the associated file or merely because of the change from one segment to another. However, prior art techniques are available that may be used to smooth such transitions and minimize dead time within messages.

When the teachings of the present invention are used with conventional answering machines that may not have the capability to mix multiple audio streams, then the mixing operation is preferably performed prior to transmitting the voice mail message to the answering machine (for example, by the caller's phone or perhaps by the telco).

FIGS. 9A and 9B depict example data structures that may be used by an implementation of the present invention. As will be obvious, these are merely one format in which the information may be stored.

As shown in FIG. 9A, each message may comprise some number of message segments. Each message segment is preferably stored as a segment number (which may be optional in some implementations), a numeric identifier corresponding to the background file selected for this segment, and the caller's message, as shown at element 900. Example code that may be used to support this message structure is shown at elements 910, 920, and 930. An upper limit on the number of segments in a particular message is shown at 910 as having the value 500, for purposes of illustration. The message structure 920 for each segment preferably stores the (optional) segment number and background selection number as integers, and stores a pointer to a file in which the content of the message segment is stored (perhaps as a wave file). Preferably, an array structure (or a linked list structure) is used as a container for the segments of a particular message, as shown at 930. If no background sound has been selected, then the background selection number may be a negative 1 or other predetermined value to indicate this situation to the mixing process.

FIG. 9B illustrates an alternative approach that may be used when both background sound and embedded audio files are supported. Again, each message may comprise some number of message segments, and in this approach each message segment is preferably stored as a segment number (which may be optional), a selection type and selection number, and an optional caller message, as shown at element 940. The selection type indicates whether the selection number represents a background sound that is associated with the caller message stored in this segment, or instead represents an embedded audio file (in which case there is preferably no caller message for this segment). Example code that may be used to support this message structure is shown at elements 950, 960, and 970. An upper limit on the number of segments in a particular message is shown at 950, and again has the value 500 for purposes of illustration. The message structure 960 for each segment preferably stores the (optional) segment number, as well as the selection type and selection number, as integers. Furthermore, the message structure 960 preferably stores a pointer to a file in which the content of the message segment is stored, where this pointer has a null value for instances of "msg_struct" that store audio file selection information. As in FIG. 9A, an array structure 970 (or a linked list structure) is preferably used as a container for the segments of a particular message.

When background and audio files are identified in other ways than with use of numeric identifiers, such as by providing a file address or URL, then the message structures 920, 960 may be adapted appropriately in ways that will be obvious to those of skill in the art.

The segments of a message may be processed (for example, during mixing or playback) by an in-order traversal of the message array 930 or 970. Or, the segment numbers stored within each segment may be used to selectively locate a particular segment. (As an alternative to storing segment numbers explicitly, an array indexing operation may be used for this purpose.) Preferably, a new instance of "msg_struct" is created each time a change in background occurs and each time an audio file is to be embedded within a voice message, thereby implicitly segmenting the voice mail message accordingly. In addition, a new instance is preferably created when the caller explicitly indicates a change in message segments (as described above with reference to element 160 of FIG. 1F).

Note that the voice mail system may employ a database to contain the voice messages and/or their pertinent information, and the structure of each message and message segment may therefore vary from what is shown in FIGS. 9A and 9B—although the basic stored information is preferably the same.

While the data structures shown in FIGS. 9A and 9B contemplate storing the content of each message segment separately from the structural information (including the identifiers of background and audio files), such that the files can be dynamically mixed upon playback to a listener, the stored content may alternatively comprise the results of the mixing (although this alternative may have negative performance implications, especially in terms of redundant storage that would be required for background and audio files that were selected for use multiple times).

Furthermore, the structure shown in FIG. 9A enables quick determination of whether a particular voice mail message has associated background sounds (and/or audio files, when using the structure shown in FIG. 9B). This provides advantages when processing stored messages. For example, the background and/or audio content for an individual message can be easily suppressed by selecting to omit the associated files. And, when embedded audio files are used for audio signatures, a convention may be adopted whereby a first instance of "msg_struct" is used to record the audio file (if any) to be used as the audio signature; a listener may then choose to skim through her voice messages by playing only these identified audio signatures. Similarly, a listener may skim through voice messages by playing one (or perhaps some limited number) of the audio files for each recorded message, or perhaps by playing one or more of the message segments (which may have associated background sounds), without imposing conventions on what may be stored therein. Many such advantageous techniques may be implemented using the teachings disclosed herein.

As has been demonstrated, the present invention provides advantageous techniques to alleviate disadvantages of distance communication, for example by conveying context such as emotions in voice mail messages and telephone conversations, and for enhancing the enjoyment and productivity of communicating with voice mail or by telephone.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or flow diagrams of methods, apparatus (systems) and computer program products according to embodiments of the invention. It will be understood that each block of the flowchart illustrations and/or flow diagrams, and combinations of blocks in the flowchart illustrations and/or flows in the flow diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or flow diagram block(s) or flow(s).

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or flow diagram block(s) or flow(s).

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or flow diagram block(s) or flow(s). Furthermore, the instructions may be executed by more than one computer or data processing apparatus, such that some aspects of the present invention operate (for example) at a VMS while other aspects operate at a telco, an audio mixing apparatus, or elsewhere.

While preferred embodiments of the present invention have been described, additional variations and modifications in those embodiments may occur to those skilled in the art once they learn of the basic inventive concepts. Therefore, it is intended that the appended claims shall be construed to include both the preferred embodiments and all such variations and modifications as fall within the spirit and scope of the invention.

The invention claimed is:

1. A system for improving telephone conversations, comprising:
   a computer comprising a processor;
   instructions which execute, using the processor, to perform functions comprising:
   selecting, by a caller, a background sound to be incorporated into a telephone conversation between the caller and a called party;
   enabling the called party to choose whether the selected background sound will be suppressed instead of incorporated; and
   incorporating the selected background sound into the telephone conversation only if the called party does not choose to suppress it.

2. The system according to claim 1, wherein the selected background sound is a theme song of the caller.

3. The system according to claim 1, wherein the incorporating is performed by conferencing the selected background sound into a 3-way call between the caller and the called party.

4. The system according to claim 1, wherein the selected background sound is a default background sound for the caller.

5. The system according to claim 1, wherein the selected background sound is programmatically selected based on an identification of the called party.

6. The system according to claim 1, wherein the enabling further comprises allowing the called party to choose to suppress all background sound from telephone conversations initiated by the caller.

7. A computer program product for improving telephone conversations, the computer program product embodied on at least one non-transitory computer-usable storage medium and comprising computer-usable program code for:
   selecting, by a caller, a background sound to be incorporated into a telephone conversation between the caller and a called party;
   enabling the called party to choose whether the selected background sound will be suppressed instead of incorporated; and
   incorporating the selected background sound into the telephone conversation only if the called party does not choose to suppress it.

8. The computer program product according to claim 7, wherein the selected background sound is a theme song of the caller.

9. The computer program product according to claim 7, wherein the incorporating is performed by conferencing the selected background sound into a 3-way call between the caller and the called party.

10. The computer program product according to claim 7, wherein the selected background sound is a default background sound for the caller.

11. The computer program product according to claim 7, wherein the selected background sound is programmatically selected based on an identification of the called party.

12. The computer program product according to claim 7, wherein the enabling further comprises allowing the called party to choose to suppress all background sound from telephone conversations initiated by the caller.

* * * * *